(12) United States Patent
Kim et al.

(10) Patent No.: US 12,252,429 B2
(45) Date of Patent: Mar. 18, 2025

(54) WINDOW MOLDING APPARATUS AND A WINDOW MOLDING METHOD USING THE SAME

(71) Applicants: Samsung Display Co., Ltd., Yongin-si (KR); INNOWORKS Co., Ltd., Daejeon (KR)

(72) Inventors: Seung Kim, Seongnam-si (KR); Young Ki Park, Daejeon (KR); Byunghoon Kang, Hwaseong-si (KR); Seungho Kim, Anyang-si (KR); Oh Joo Park, Suwon-si (KR); Jong Soo Baek, Sejong-si (KR); Gyuin Shim, Yongin-si (KR); Dae Seong Im, Daejeon (KR)

(73) Assignees: SAMSUNG DISPLAY CO., LTD., Gyeonggi-Do (KR); INNOWORKS CO., LTD., Daejeon (KR)

( * ) Notice: Subject to any disclaimer, the term of this patent is extended or adjusted under 35 U.S.C. 154(b) by 658 days.

(21) Appl. No.: 17/495,774

(22) Filed: Oct. 6, 2021

(65) Prior Publication Data

US 2022/0106217 A1    Apr. 7, 2022

(30) Foreign Application Priority Data

Oct. 7, 2020    (KR) .......................... 10-2020-0129326

(51) Int. Cl.
*C03B 23/03* (2006.01)
*C03C 21/00* (2006.01)

(52) U.S. Cl.
CPC ............ *C03B 23/03* (2013.01); *C03C 21/002* (2013.01); *C03B 2215/50* (2013.01)

(58) Field of Classification Search
None
See application file for complete search history.

(56) References Cited

U.S. PATENT DOCUMENTS

| 2,882,952 | A | * | 4/1959 | Johnson | B21D 7/06 |
| | | | | | 72/396 |
| 6,672,127 | B2 | * | 1/2004 | Maida | B21D 5/0209 |
| | | | | | 72/396 |

(Continued)

FOREIGN PATENT DOCUMENTS

| JP | 5606460 | 9/2014 |
| KR | 101163568 | 7/2012 |

(Continued)

OTHER PUBLICATIONS https://www.youtube.com/watch?v=XgBz_InpwD4 (Year: 2020).*

*Primary Examiner* — Jodi C Franklin
(74) *Attorney, Agent, or Firm* — CANTOR COLBURN LLP

(57) ABSTRACT

An apparatus for molding a window, the apparatus includes: a first molding part; a jig disposed below the first molding part, the jig including a bottom surface and a plurality of side surfaces configured to support and seat a work piece to be processed into a window; and an second molding part disposed on the bottom surface, wherein the second molding part includes: a lower surface adjacent to the bottom surface; an upper surface facing the lower surface; a first cavity having a first curved surface generally concave in a direction facing the lower surface; a plurality of second cavities extending from the first cavity, the plurality of second-cavities having second curved surfaces; and a plurality of movable molds disposed on the second-cavities supported for movement along the second curved surfaces, respectively.

17 Claims, 25 Drawing Sheets
(1 of 25 Drawing Sheet(s) Filed in Color)

(56) References Cited

U.S. PATENT DOCUMENTS

| | | | |
|---|---|---|---|
| 7,584,640 B1 * | 9/2009 | Liu | B21D 5/02 |
| | | | 72/389.8 |
| 8,665,236 B2 | 3/2014 | Myers | |
| 10,759,689 B2 | 9/2020 | Chau et al. | |
| 2012/0058303 A1 | 3/2012 | Gabel et al. | |
| 2013/0243548 A1 * | 9/2013 | Yamamoto | B65B 3/022 |
| | | | 413/1 |
| 2015/0000340 A1 | 1/2015 | Jang et al. | |
| 2015/0231680 A1 * | 8/2015 | Jones | H05B 6/103 |
| | | | 72/18.2 |
| 2015/0266073 A1 * | 9/2015 | Sperrer | B21D 5/02 |
| | | | 72/342.96 |
| 2017/0121210 A1 | 5/2017 | Rai et al. | |
| 2019/0187757 A1 | 6/2019 | Choi et al. | |
| 2019/0248692 A1 | 8/2019 | Hwang et al. | |

FOREIGN PATENT DOCUMENTS

| | | |
|---|---|---|
| KR | 101451207 | 10/2014 |
| KR | 101483222 | 1/2015 |
| KR | 1020150001964 | 1/2015 |
| KR | 1020150048450 | 5/2015 |
| KR | 101585633 | 1/2016 |
| KR | 101597526 | 2/2016 |
| KR | 101638579 | 7/2016 |
| KR | 101721082 | 3/2017 |
| KR | 101775333 | 9/2017 |
| KR | 1020170123978 | 11/2017 |
| KR | 1020170125806 | 11/2017 |
| KR | 1020180038610 | 4/2018 |
| KR | 1020180074780 | 7/2018 |
| KR | 1020180076419 | 7/2018 |
| KR | 101893830 | 8/2018 |
| KR | 101892388 | 9/2018 |
| KR | 101904825 | 10/2018 |
| KR | 101987377 | 6/2019 |
| KR | 1020190071854 | 6/2019 |
| KR | 1020190098284 | 8/2019 |
| KR | 102051147 | 12/2019 |
| KR | 1020200063653 A | 6/2020 |
| WO | 2020162468 A1 | 8/2020 |

* cited by examiner

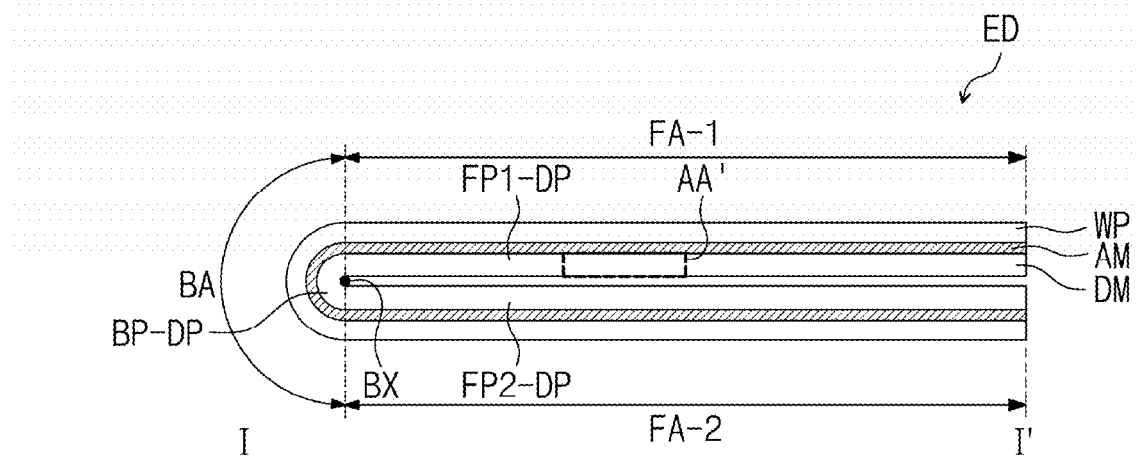
FIG. 1C
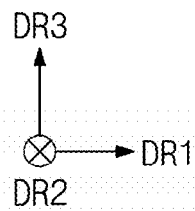

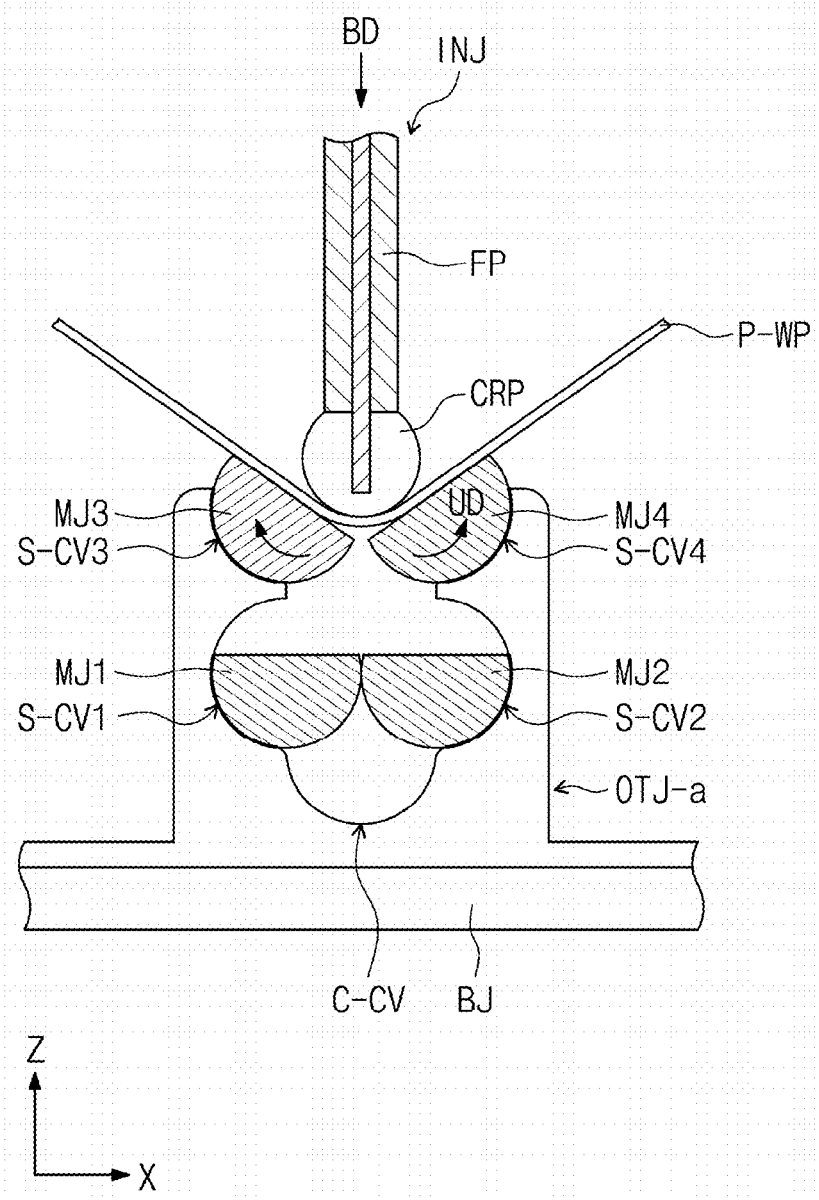

WINDOW MOLDING APPARATUS AND A WINDOW MOLDING METHOD USING THE SAME

CROSS-REFERENCE TO RELATED APPLICATIONS

This application claims priority from and the benefit of Korean Patent Application No. 10-2020-0129326, filed on Oct. 7, 2020, which is hereby incorporated by reference for all purposes as if fully set forth herein.

BACKGROUND

Field

Embodiments of the invention relate generally to a window molding and a window molding method using the same and, more specifically, to a window molding apparatus for manufacturing a window having a bent portion that is bent at a large bending angle and a window molding method.

DISCUSSION OF THE BACKGROUND

An electronic device includes a window, a housing, and electronic elements. The electronic elements include various elements activated by an electrical signal such as a display element, a touch element, or a detection element. The window protects the electronic elements and provides an active area to a user. Thus, the user may provide an input to the electronic elements or receive information generated in the electronic elements through the window. In addition, the electronic elements may be stably protected against external impacts through the window.

Recently, a curved display device or bent display device, which displays an image through each of a front surface, a rear surface, side surfaces has been developed The above information disclosed in this Background section is only for understanding of the background of the inventive concepts, and, therefore, it may contain information that does not constitute prior art.

SUMMARY

Applicant recognized that window processing technology having various shapes should be developed for use with various types of curved or bent display devices.

Window molding apparatus for manufacturing a window constructed according to the principles and illustrative implementations of the invention are capable of manufacturing a window having a portion that is bent at a large bending angle. Window molding methods according to the principles and illustrative implementations of the invention can readily process a window having a portion that is bent at a large bending angle Additional features of the inventive concepts will be set forth in the description which follows, and in part will be apparent from the description, or may be learned by practice of the inventive concepts.

According to one aspect of the invention, an apparatus for molding a window, the apparatus includes: a first molding part; a jig disposed below the first molding part, the jig including a bottom surface and a plurality of side surfaces configured to support and seat a work piece to be processed into a window; and an second molding part disposed on the bottom surface, wherein the second molding part includes: a lower surface adjacent to the bottom surface; an upper surface facing the lower surface; a first cavity having a first curved surface generally concave in a direction facing the lower surface; a plurality of second cavities extending from the first cavity, the plurality of second-cavities having second curved surfaces; and a plurality of movable molds disposed on the second-cavities supported for movement along the second curved surfaces, respectively.

Each of the movable molds may include a curved portion having a third curved surface corresponding to the second curved surface and a substantially flat portion facing the curved portion.

The work piece may include first and second substantially non-bent portions, with a bendable portion disposed therebetween, in a first position the first substantially non-bent portion, the bendable portion, and the second substantially non-bent portion may be substantially flat, with the substantially flat portion of each of the movable molds being disposed generally parallel to the lower surface, and in a second position a bent portion may be generally concavely bent to the first cavity, and the substantially flat portion of each of the movable molds may be disposed generally perpendicular to the lower surface.

The second cavities may include a first sub-cavity and a second sub-cavity, which may be disposed in a generally symmetrical position with respect to the first cavity, and the movable molds may include a first movable mold disposed in the first sub-cavity and a second movable mold disposed in the second sub-cavity.

The work piece may include first and second substantially non-bent portions, with a bendable portion disposed therebetween, in a first position the first substantially non-bent portion, the bendable portion, and the second substantially non-bent portion may be substantially flat, the first movable mold and the second movable mold being disposed adjacent to each other below the work piece, and in a second position the bendable portion may be generally concavely bent in the first cavity, the first movable mold and the second movable mold may be spaced apart from and face each other with the first substantially non-bent portion and the second substantially non-bent portion therebetween.

The first molding part may include an inner molding part including a substantially flat molding and a core molding disposed on one end of the substantially flat molding, the core molding and having a curved lower surface.

The lower surface of the core molding part may have a fourth curved surface corresponding to the first curved surface, wherein the fourth curved surface may have a radius of curvature approximately equal to or less than a radius of curvature of the first curved surface.

The inner molding further may include a heating member inserted into a through-hole extending through the substantially flat molding and extend to the core molding.

The first molding part may define a flow path, and the window molding apparatus may further include a pump to inject air toward the second molding part through the flow path.

The second cavities may include N sub-cavities, and the N sub-cavities may be provided in pairs by two and defined between the first cavity and the upper surface, where the N may be an even number of 2 or more.

Two of the N sub cavities may be disposed generally symmetrical to the first cavity.

The movable molds may include N movable molds disposed in one to one correspondence with the N sub-cavities.

Each of the sub cavities defined at an M-th sequence from the first cavity may have a radius of curvature different from a radius of curvature of each of the sub-cavities defined at an (M+1)-th sequence from the first cavity, where the M may be an integer of 1 or more and N/2 or less.

The first molding part may include an inner molding part, the second molding part may include an outer molding part, the first cavity may include a core cavity and the second cavities may include sub-cavities.

According to another aspect of the invention, a method of molding a window using a window molding apparatus comprising an first molding part and an second molding part, wherein the second molding part includes a first cavity having a first curved surface, a plurality of second cavities having second curved surfaces, and a plurality of movable molds supported for movement along the second curved surfaces of the second cavities, the window molding method including the steps of: positioning a work piece for processing between the first molding part and the second molding part; heating the work piece; and molding the work piece by moving a portion of the work piece along the first curved surface of the first cavity to form a bent portion and after heating to form a first substantially non-bent portion and a second substantially non-bent portion facing the first portion with the bent portion disposed therebetween.

The work piece may include a glass substrate, and wherein the step of heating the work piece may include heating at least one of the first molding part or the second molding part to reduce viscosity of the member to about 107 poises to about 109 poises.

The first molding part may include an inner molding part including a substantially flat molding and a core molding disposed on one end of the substantially flat molding, and wherein the step of molding the work piece may include moving the inner molding part such that the core molding part may be received in the first cavity with the work piece disposed therebetween.

The first molding part may include a flow path, and wherein the step of molding the work piece may include injecting air having a pressure of about 2 kgf/cm$^2$ to about 10 kgf/cm$^2$ through the flow path.

Each of the movable molds may include a curved portion having a curved surface corresponding to the curved surface of each of the second cavities and a substantially flat portion facing the curved portion; wherein the step of positioning the work piece may include positioning the substantially flat portions of the adjacent movable molds adjacent to each other below a workpiece in positions generally parallel to each other, and wherein the step of molding the work piece may include moving the substantially flat portions of the adjacent movable molds to face each other with the work piece disposed therebetween.

The second cavities may include N sub-cavities sequentially defined in pairs by two from the core cavities, and the movable molds may include N movable molds disposed in one to one correspondence with the N sub-cavities, and wherein the step of molding the work piece may include, as a bent portion gradually approaches the first cavity, work sequentially moving the work piece along the curved surfaces of the sub-cavities in order from the movable molds spaced apart from the bent portion to the movable molds disposed adjacent to the core cavity among the N movable molds, wherein the N may be an even number of 2 or more.

The step may include chemically strengthening the work piece.

An apparatus for molding a window includes: a first molding part; and a second molding part disposed below the first molding part, wherein the second molding part includes: a lower surface; an upper surface facing the lower surface; a first cavity having a first curved surface substantially concave in a direction facing the lower surface; at least two second cavities extending from the first cavity, the at least two second cavities having second curved surfaces; and at least two movable molds seated on the at least two second cavities to, respectively, and supported for rotation about shafts.

The at least two movable molds may be spaced apart from the at least two second cavities.

The first molding part may include an inner molding part, the second molding part may include an outer molding part, the first cavity may include a core cavity and the second cavities may include sub-cavities.

It is to be understood that both the foregoing general description and the following detailed description are illustrative and explanatory and are intended to provide further explanation of the invention as claimed.

BRIEF DESCRIPTION OF THE DRAWINGS

The patent or application file contains at least one drawing executed in color. Copies of this patent or patent application publication with the color drawing will be provided by the Office upon request and payment of the necessary fee.

The accompanying drawings, which are included to provide a further understanding of the invention and are incorporated in and constitute a part of this specification, illustrate illustrative embodiments of the invention, and together with the description serve to explain the inventive concepts.

FIG. 1C is a cross-sectional view taken along line I-I' of FIG. 1A.

FIG. 20A is a cross-sectional view illustrating a step of another process of a window molding method according to the principles of the invention.

DETAILED DESCRIPTION

Figure 1A:
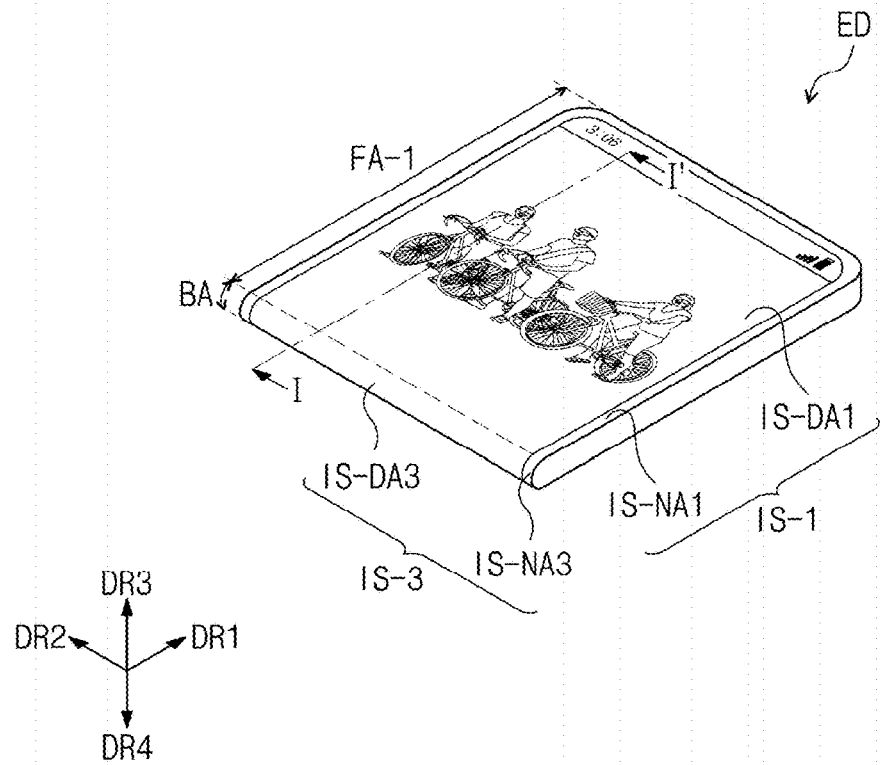
FIG. 1A is a top, perspective view of an embodiment of an electronic device constructed according to the principles of the invention.

In the following description, for the purposes of explanation, numerous specific details are set forth in order to provide a thorough understanding of various embodiments or implementations of the invention. As used herein "embodiments" and "implementations" are interchangeable words that are non-limiting examples of devices or methods employing one or more of the inventive concepts disclosed herein. It is apparent, however, that various embodiments may be practiced without these specific details or with one or more equivalent arrangements. In other instances, well-known structures and devices are shown in block diagram form in order to avoid unnecessarily obscuring various embodiments. Further, various embodiments may be different, but do not have to be exclusive. For example, specific shapes, configurations, and characteristics of an embodiment may be used or implemented in another embodiment without departing from the inventive concepts.

Unless otherwise specified, the illustrated embodiments are to be understood as providing illustrative features of varying detail of some ways in which the inventive concepts may be implemented in practice. Therefore, unless otherwise specified, the features, components, modules, layers, films, panels, regions, plates, portions and/or aspects, etc. (hereinafter individually or collectively referred to as "elements"), of the various embodiments may be otherwise combined, separated, interchanged, and/or rearranged without departing from the inventive concepts.

The use of cross-hatching and/or shading in the accompanying drawings is generally provided to clarify boundaries between adjacent elements. As such, neither the presence nor the absence of cross-hatching or shading conveys or indicates any preference or requirement for particular materials, material properties, dimensions, proportions, commonalities between illustrated elements, and/or any other characteristic, attribute, property, etc., of the elements, unless specified. Further, in the accompanying drawings, the size and relative sizes of elements may be exaggerated for clarity and/or descriptive purposes. When an embodiment may be implemented differently, a specific process order may be performed differently from the described order. For example, two consecutively described processes may be performed substantially at the same time or performed in an order opposite to the described order. Also, like reference numerals denote like elements.

When an element, such as a layer, is referred to as being "on," "disposed," "connected to," or "coupled to" another element or layer, it may be directly on, disposed on, connected to, or coupled to the other element or layer or intervening elements or layers may be present. When, however, an element or layer is referred to as being "directly on," "directly disposed on," "directly connected to," or "directly coupled to" another element or layer, there are no intervening elements or layers present. For example, "directly disposed" may mean being disposed without using any additional member such as an adhesion member between two layers or two members. To this end, the term "connected" may refer to physical, electrical, and/or fluid connection, with or without intervening elements. As used herein, the term "and/or" includes any and all combinations of one or more of the associated listed items.

Although the terms "first," "second," etc. may be used herein to describe various types of elements, these elements should not be limited by these terms. These terms are used to distinguish one element from another element. Thus, a first element discussed below could be termed a second element without departing from the teachings of the disclosure.

Spatially relative terms, such as "beneath," "below," "under," "lower," "above," "upper," "over," "higher," "side" (e.g., as in "sidewall"), and the like, may be used herein for descriptive purposes, and, thereby, to describe one elements relationship to another element(s) as illustrated in the drawings. Spatially relative terms are intended to encompass different orientations of an apparatus in use, operation, and/or manufacture in addition to the orientation depicted in the drawings. For example, if the apparatus in the drawings is turned over, elements described as "below" or "beneath" other elements or features would then be oriented "above" the other elements or features. Thus, the term "below" can encompass both an orientation of above and below. Furthermore, the apparatus may be otherwise oriented (e.g., rotated 90 degrees or at other orientations), and, as such, the spatially relative descriptors used herein interpreted accordingly.

The terminology used herein is for the purpose of describing particular embodiments and is not intended to be limiting. As used herein, the singular forms, "a," "an," and "the" are intended to include the plural forms as well, unless the context clearly indicates otherwise. Moreover, the terms "comprises," "comprising," "includes," and/or "including," when used in this specification, specify the presence of stated properties, fixed numbers, features, integers, steps, operations, elements, components, and/or groups thereof, but do not preclude the presence or addition of one or more other properties, fixed numbers, features, integers, steps, operations, elements, components, and/or groups thereof. It is also noted that, as used herein, the terms "substantially," "about," and other similar terms, are used as terms of approximation and not as terms of degree, and, as such, are utilized to account for inherent deviations in measured, calculated, and/or provided values that would be recognized by one of ordinary skill in the art.

Various embodiments are described herein with reference to sectional and/or exploded illustrations that are schematic illustrations of idealized embodiments and/or intermediate structures. As such, variations from the shapes of the illustrations as a result, for example, of manufacturing techniques and/or tolerances, are to be expected. Thus, embodiments disclosed herein should not necessarily be construed as limited to the particular illustrated shapes of regions, but are to include deviations in shapes that result from, for instance, manufacturing. In this manner, regions illustrated in the drawings may be schematic in nature and the shapes of these regions may not reflect actual shapes of regions of a device and, as such, are not necessarily intended to be limiting.

Unless otherwise defined, all terms (including technical and scientific terms) used herein have the same meaning as commonly understood by one of ordinary skill in the art to which this disclosure is a part. Terms, such as those defined in commonly used dictionaries, should be interpreted as having a meaning that is consistent with their meaning in the context of the relevant art and should not be interpreted in an idealized or overly formal sense, unless expressly so defined herein.

Figure 1B:
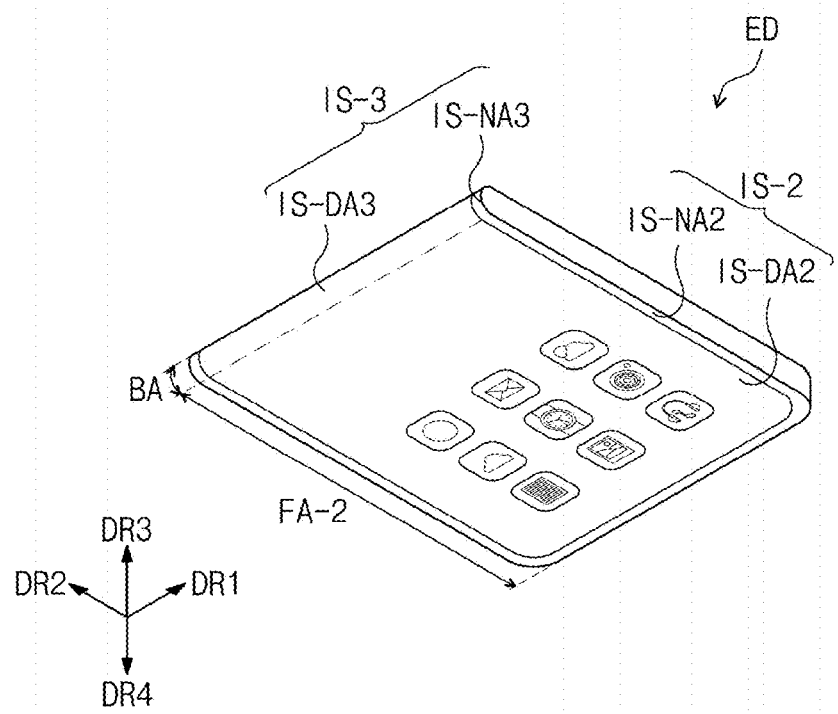
FIG. 1B is a bottom perspective view of the electronic device of FIG. 1A.

FIG. 1A is a top, perspective view of an embodiment of an electronic device constructed according to the principles of the invention. FIG. 1B is a bottom perspective view of the electronic device of FIG. 1A.

An electronic device ED may include a plurality of display surfaces IS-1, IS-2, and IS-3. The electronic device ED may display an image on the plurality of display surfaces IS-1, IS-2, and IS-3. FIGS. 1A and 1B are perspective views of the same electronic device ED when viewed on the same drawing, respectively. FIG. 1A is a perspective view of the electronic device ED when viewed in a third direction DR3, and FIG. 1B is a perspective view of the electronic device ED when viewed in a fourth direction DR4.

In FIGS. 1A and 1B and the following figures, the first to fourth direction axes DR1 to DR4 are illustrated, and directions indicated by the first to fourth direction axes DR1, DR2, DR3, and DR4, which are described in this specification are relative concepts and thus may be changed into different directions.

As used herein, the first direction axis DR1 and the second direction axis DR2 may be perpendicular to each other, and the third direction axis DR3 and the fourth direction axis DR4 may be normal directions with respect to a plane defined by the first direction DR1 and the second direction DR2. The third direction axis DR3 and the fourth direction axis DR4 may be directions that extend in directions opposite to each other.

Also, an X-axis X, a Y-axis Y, and a Z-axis Z are illustrated in this specification, and in this specification. In this specification, for convenience of description, a direction of the Z-axis Z is defined as an upward direction. Further, the X-axis X and the Y-axis Y may be perpendicular to each other, and the direction of the Z-axis Z may be a normal direction with respect to a plane defined by the X-axis X and the Y-axis Y.

The electronic device ED may be activated according to an electrical signal. The electronic device ED may include various examples. For example, the electronic device ED may include or take the form of a tablet, a notebook, a computer, a smart television, and the like. In this embodiment, an electronic device ED as a smart phone described hereinafter as an example.

The electronic device ED includes a first substantially flat area FA-1 including a first display surface IS-1, a second substantially flat area FA-2 including a second display surface IS-2, and a bent area BA including the third display surface IS-3. The bent area BA may be a portion disposed between the first substantially flat area FA-1 and the second substantially flat area FA-2. In FIGS. 1A and 1B, although the bent area BA is illustrated as having a curved surface, the embodiments are not limited thereto. For example, the bent area BA may be disposed between the first substantially flat area FA-1 and the second substantially flat area FA-2 and have a curved surface which may include a staple-like shape ("⌐" shape). The first substantially flat area FA-1 and the second substantially flat area FA-2 may be spaced apart and face each other in the direction of the third direction axis DR3.

The first display surface IS-1 may include a first display area IS-DA1 and a first peripheral area IS-NA1 adjacent to the first display area IS-DA1. The second display surface IS-2 includes a second display area IS-DA2 and a second peripheral area IS-NA2 adjacent to the second display area IS-DA2, and the third display surface IS-3 may include a third display area IS-DA3 and a third peripheral area IS-NA3 adjacent to the third display area IS-DA3. As used herein, each of the display areas IS-DA1, IS-DA2, and IS-DA3 is defined as an area on which an actual image can be displayed, and each of the peripheral areas IS-NA1, IS-NA2, IS-NA3 is defined as an area on which an image cannot be displayed. Each of the peripheral areas IS-NA1, IS-NA2, and IS-NA3 may be provided in various colors through a printed layer. However, the embodiments are not limited thereto, and at least a portion of the peripheral areas IS-NA1, IS-NA2, and IS-NA3 may be omitted.

The first display surface IS-1 may be generally parallel to a plane defined by the first direction axis DR1 and the second direction axis DR2. The first display surface IS-1 may be a substantially flat surface when viewed on the plane. As used herein, the meaning of "when viewed on the plane or in the plan view" may mean when viewed in the direction of the third direction axis DR3 or the fourth direction axis DR4. A front surface (or a top surface) and a rear surface (or a bottom surface) of each of layers or units, which will be described below, are distinguished by the third direction axis DR3. The first display area IS-DA1 of the first display surface IS-1 may provide an image in the direction of the third direction axis DR3.

Also, in the electronic device ED, the second display surface IS-2 may be generally parallel to the plane defined by the first direction axis DR1 and the second direction axis DR2. The second display surface IS-2 may be a substantially flat surface when viewed on the plane. The second display surface IS-2 may be generally parallel to the first display surface IS-1. The second display area IS-DA2 of the second display surface IS-2 may provide an image in the direction of the fourth direction axis DR4.

The third display surface IS-3 may be a portion disposed between the first display surface IS-1 and the second display surface IS-2, and each of the first display surface IS-1 and the second display surface IS-2 may be a portion bent at an angle of about 180° with respect to the third display surface IS-3. The third display area IS-DA3 of the third display surface IS-3 may provide an image in a direction between the third direction axis DR3 and the fourth direction axis DR4. The first display surface IS-1 and the second display surface IS-2 may be spaced apart from each other with the third display surface IS-3 therebetween in the direction of the third direction axis DR3 or the fourth direction axis DR4. The third display surface IS-3 may have a curved shape that is convex outward. However, the embodiments are not limited thereto. The third display surface IS-3 may be a substantially flat surface. Alternatively, unlike this example, the curved surface of the third display surface IS-3 may have a half-elliptic shape in a cross-section parallel to the surface defined by the first direction axis DR1 and the third direction axis DR3, or the third display surface IS-3 may have both a curved surface and a substantially flat surface. The third display surface IS-3 may provide an image in a direction different from the direction in which the first display surface IS-1 and the second display surface IS-2 provide an image and may be provided in various shapes in the form including a bent portion between the first display surface IS-1 and the second display surface IS-2.

Each of the first to third display areas IS-DA1, IS-DA2, and IS-DA3 may display u) different images. The images displayed on the first to third display areas IS-DA1, IS-DA2, and IS-DA3 may be the same one image or different images. Also, the images displayed from each of the first to third display areas IS-DA1, IS-DA2, and IS-DA3 may be connected to each other to display one image. Each of the first to third display areas IS-DA1, IS-DA2, and IS-DA3 may be controlled independently of each other.

Figure 1D:
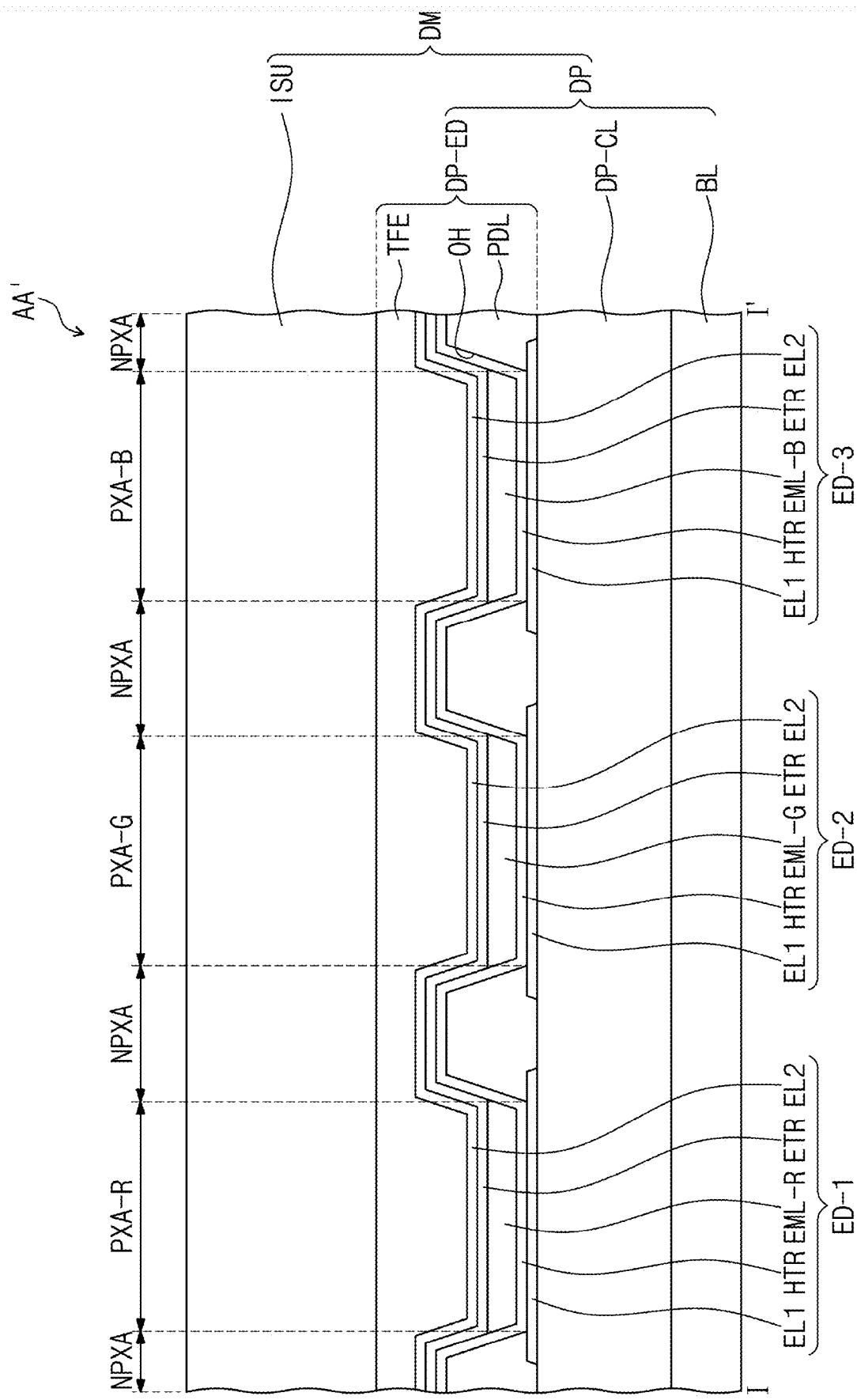
FIG. 1D is a cross-sectional view of an area AA' of FIG. 1C.

FIG. 1C is a cross-sectional view taken along line I-I' of FIG. 1A. FIG. 1D is a cross-sectional view of an area AA' of FIG. 1C. FIG. 1D is a cross-sectional view illustrating a portion corresponding to an area AA' of FIG. 1C.

Referring to FIG. 1C, an electronic device ED may include a display module DM and a window WP disposed on the display module DM. In an embodiment, the window WP may be disposed outside the display module DM. The window WP may cover the entire outside of the display module DM. The window WP may have a shape corresponding to the shape of the display module DM. The display module DM may include substantially flat portions FP1-DP and FP2-DP and a bent portion BP-DP. The bent portion BP-DP may be a portion that is bent with respect to a bending axis BX extending in one direction generally parallel to the second direction axis DR2. In an embodiment, an adhesive layer AM may be disposed between the display module DM and the window WP. The adhesive layer AM may be an optically clear adhesive layer.

Referring to FIG. 1D, the display module DM may include a display panel DP to output an image displayed on the electronic device ED. The display panel DP may include a light emitting element layer DP-ED including an organic light emitting element, a quantum dot light emitting element, a micro LED light emitting element, or a nano LED light emitting element. The light emitting element layer DP-ED may be configured to substantially generate an image. Hereinafter, the display panel DP is described as an organic light emitting display panel, but the embodiments are not limited thereto.

The display panel DP may have a bent shape as illustrated in FIG. 1C. However, the embodiments are not limited thereto, and the display panel DP may have a different type of bending state than that illustrated in FIG. 1C, or the display panel DP is a flexible display panel that is bendable or unfoldable. For example, the flexible display panel DP may be bent to be inserted into the bent window WP at a large bending angle.

The display panel DP includes a base layer BL, a circuit layer DP-CL disposed on the base layer BL, a light emitting element layer DP-ED, and an upper insulating layer TFE. The base layer BL may include a plastic substrate, a glass substrate, a metal substrate, and an organic/inorganic composite substrate. For example, the base layer BL may include at least one polyimide layer.

The circuit layer DP-CL includes at least one insulating layer, semiconductor patterns, and conductive patterns. The insulating layer includes at least one inorganic layer and at least one organic layer. The semiconductor patterns and the conductive patterns may constitute signal lines, a pixel driving circuit, and a scan driving circuit. For example, the circuit layer DP-CL includes a switching transistor and a driving transistor for driving the light emitting elements ED-1, ED-2, and ED-3 of the light emitting element layer DP-ED.

The light emitting element layer DP-ED includes a display element, for example, the light emitting elements ED-1, ED-2, and ED-3. The light emitting element layer DP-ED may further include an organic layer such as a pixel defining layer PDL. The display module DM may include a non-emission area NPXA and emission areas PXA-R, PXA-G, and PXA-B. Each of the emission areas PXA-R, PXA-G, and PXA-B may be an area from which light generated from each of the light emitting elements ED-1, ED-2, and ED-3 is emitted.

Each of the light emitting elements ED-1, ED-2, and ED-3 includes a first electrode EL1, a hole transport region HTR, an electron transport region ETR, and a second electrode EL2, and respective light emitting layers EML-R, EML-G, and EML-B.

FIG. 1D illustrate an embodiment in which the light emitting layers EML-R, EML-G, and EML-B of the light emitting elements ED-1, ED-2, and ED-3 are disposed in an opening OH defined in the pixel defining layer PDL, and the hole transport region HTR, the electron transport region ETR, and the second electrode EL2 are provided as common layers in all of the light emitting elements ED-1, ED-2, and ED-3. However, the embodiments are not limited thereto, and unlike FIG. 2, the hole transport region HTR and the electron transport region ETR may be patterned in the opening OH defined in the pixel defining layer PDL. For example, the hole transport region HTR, the light emitting layers EML-R, EML-G, and EML-B, and the electron transport region ETR of the light emitting elements ED-1, ED-2, and ED-3 and the like may be provided by being patterned by an inkjet printing method.

In the display panel DP, the plurality of light emitting elements ED-1, ED-2, and ED-3 may emit light having different wavelength regions. For example, the display panel DP may include a first light emitting element ED-1 that emits red light, a second light emitting element ED-2 that emits green light, and a third light emitting element ED-3 that emits blue light. That is, a red emission area PXA-R, a green emission area PXA-G, and a blue emission area PXA-B of the display module DM may correspond to, respectively, the first light emitting element ED-1, the second light emitting element ED-2, and the third light emitting element ED-3.

However, the embodiments are not limited thereto, and the first to third light emitting elements ED-1, ED-2, and ED-3 may emit light having substantially the same wavelength region, or at least one of the light emitting elements may emit light having a different wavelength region. For example, all of the first to third light emitting elements ED-1, ED-2, and ED-3 may emit blue light.

The upper insulating layer TFE may include a plurality of thin films. Some of the thin films may be disposed to improve optical efficiency, and some of the thin film may be disposed to protect the light emitting elements. The upper insulating layer TFE may include a thin film encapsulation layer including a lamination structure of an inorganic layer/organic layer/inorganic layer.

The display module DM may further include a sensor layer ISU. The sensor layer ISU may be disposed on the display panel DP. The sensor layer ISU may sense an external input applied from the outside. The external input may be a user's input. The user's input may include various types of external inputs such as a portion of user's body, such as a finger, light, heat, a pen, a pressure, or the like.

The sensor layer ISU may be formed on the upper insulating layer TFE through a continuous process. In this case, the sensor layer ISU is directly disposed on the upper insulating layer TFE. The direct disposition may mean that a third component is not disposed between the sensor layer ISU and the upper insulating layer TFE. That is, a separate adhesive member may not be disposed between the sensor layer ISU and the upper insulating layer TFE. However, the embodiments are not limited thereto, and an adhesive member may be further disposed between the sensor layer ISU and the upper insulating layer TFE. The sensor layer ISU may include sensing electrodes that sense an external input, and the sensing electrodes may be made of transparent metal oxide or the like.

Figure 2:
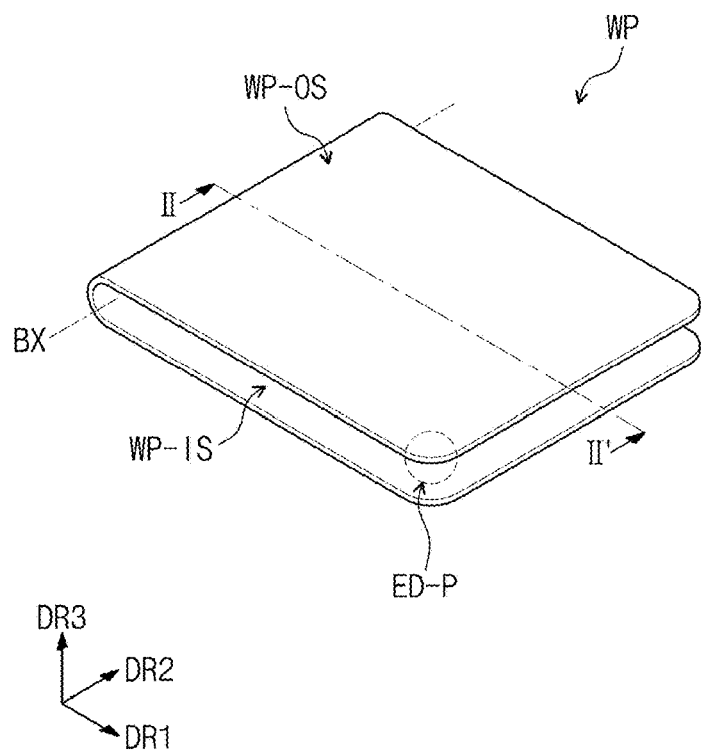
FIG. 2 is a perspective view of an embodiment of a window constructed according to the principles of the invention.
Figure 3:
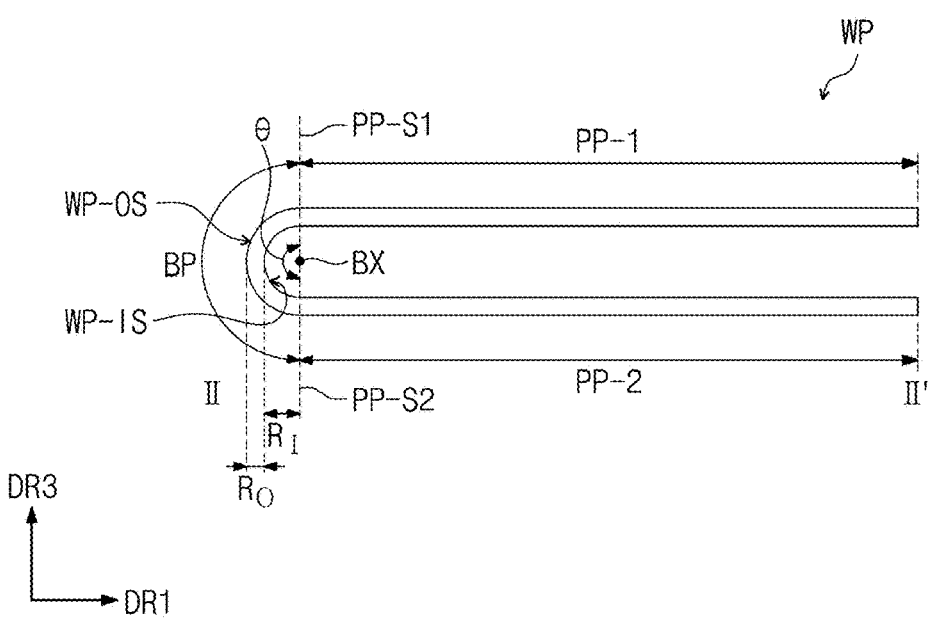
FIG. 3 is a cross-sectional view taken along line II-IF of the window of FIG. 2.

FIG. 2 is a perspective view of an embodiment of a window constructed according to the principles of the invention. FIG. 3 is a cross-sectional view taken along line II-IF of the window of FIG. 2.

The window WP illustrated in FIGS. 2 and 3 may be provided in the electronic device ED (see FIG. 1A) illustrated in FIGS. 1A and 1B. The window WP may correspond to the uppermost layer of the electronic device ED. The window WP may be a tempered glass substrate subjected to a tempered treatment. A display module DM (see FIG. 1C) may be attached to an inner side WP-IS of the window WP, and an outer side WP-OS of the window WP may be defined as the display surfaces IS-1, IS-2, and IS-3 (see FIG. 1A). The window WP may include a reinforced surface to stably protect the display module DM (see FIG. 1C) from an external impact.

The window WP may include a first portion, a second portion, and a third portion disposed between the first portion and the second portion. The third portion may be disposed between the first portion and the second portion and include a bent portion. The third portion may be a portion including a curved surface or a substantially flat surface.

Hereinafter, the third portion BP may be referred to as a bent potion BP, and the first portion PP-1 and the second portion PP-2 may be referred to as a first non-bent portion PP-1 and a second non-bent portion PP-2, respectively. The window WP may include the bent portion BP and the first and second non-bent portions PP-1 and PP-2, which are respectively disposed on both sides of the bent portion BP. The window WP may further include a printed layer disposed at an edge of the inner side WP-IS or the outer side WP-OS. For example, the printed layer may be a portion corresponding to the peripheral areas IS-NA1, IS-NA2, and IS-NA3, FIGS (see FIGS. 1A and 1B).

Referring to FIGS. 2 and 3, in the window WP, the bent portion BP may be a portion bent with respect to the bending axis BX extending in one direction generally parallel to the second direction axis DR2. In the window WP, the first non-bent portion PP-1 and the second non-bent portion PP-2 disposed with the bent portion BP therebetween may face each other and be generally parallel to each other. However, the embodiments are not limited thereto, and an extended surface of the first non-bent portion PP-1 and an extended surface of the second non-bent portion PP-2 may not be parallel to each other. For example, when the extension surface of the first non-bent portion PP-1 and the extension surface of the second non-bent portion PP-2 gradually approach each other in the first direction axis DR1 that is an extending direction of the extension surface, the extension surfaces may gradually close to each other or gradually away from each other in the first direction axis DR1 that is the extending direction.

The window WP may be rigid. The window WP may be fixed in a shape in which the first non-bent portion PP-1 and the second non-bent portion PP-2 face each other so as to be spaced apart from each other with the bent portion BP therebetween.

In FIGS. 2 and 3, the first non-bent portion PP-1 and the second non-bent portion PP-2 facing each other have substantially the same surface area, but the embodiments are not limited thereto. The first non-bent portion PP-1 and the second non-bent portion PP-2 disposed with the bent portion BP therebetween may have surface areas different from each other. Also, in FIGS. 2 and 3, the shapes of the first non-bent portion PP-1 and the second non-bent portion PP-2 facing each other are illustrated to be generally symmetrical with respect to the bent portion BP, but the embodiments are limited thereto. For example, the shapes of the first non-bent portion PP-1 and the second non-bent portion PP-2 may be different from each other.

In the window WP, the bent portion BP may be defined as a portion between a portion at which the first non-bent portion PP-1 starts, and a portion at which the second non-bent portion PP-2 starts. The bent portion BP may be a portion having a generally circular shape with a predetermined radius of curvature in the cross-section or a portion of an ellipse in the cross-section. Also, the bent portion BP may include both the curved surface and the substantially flat surface.

As used herein, a bending angle θ of the bent portion BP may be defined as an angle between the point PP-S1, at which the first non-bent portion PP-1 starts, and the point PP-S2, at which the second non-bent portion PP-2 starts. The bending angle θ in the window WP illustrated in FIGS. 2 and 3 may be about 180°.

The bending angle θ in the window WP manufactured by the window molding apparatus constructed according to the principles and embodiments of the invention, may be greater than about 120°. That is, the window WP may be bent at the bending angle θ greater than about 120°. Also, the bending angle θ in the window WP may be greater than about 180°. For example, the bending angle θ may be about 180° or more and may be less than an angle within a range in which the two non-bent portions PP-1 and PP-2 do not meet each other.

In FIG. 2, four corner edges ED-P of the window WP are illustrated as being curved, but the embodiments are not limited thereto. At least one of the corner edges ED-P of the window WP may have a right angle shape in the plane defined by the first direction axis DR1 and the second direction axis DR2. For example, each of the corner edges ED-P of the window WP may have a radius of curvature of about 0.1 mm to about 15 mm.

The corner edges ED-P of the window WP may be a substantially flat surface generally parallel to the plane defined by the first and second directional axes DR1 and DR2. However, the embodiments are not limited thereto, and the corner edges ED-P may include portions bent in the direction of the fourth direction axis DR4. The corner edges ED-P may have one bent portion corresponding to a corner portion or may have two or four bent portions around the corner portion.

The window WP may include the bent portion BP, which is bent with respect to the bending axis BX, and the bent portion BP may have a radius of curvature of about 1 mm to about 10 mm. The inner side of the window WP-IS may have a radius of curvature $R_I$ less than the radius of curvature $R_O$ of the outer side WP-OS of the window.

Figure 4A:
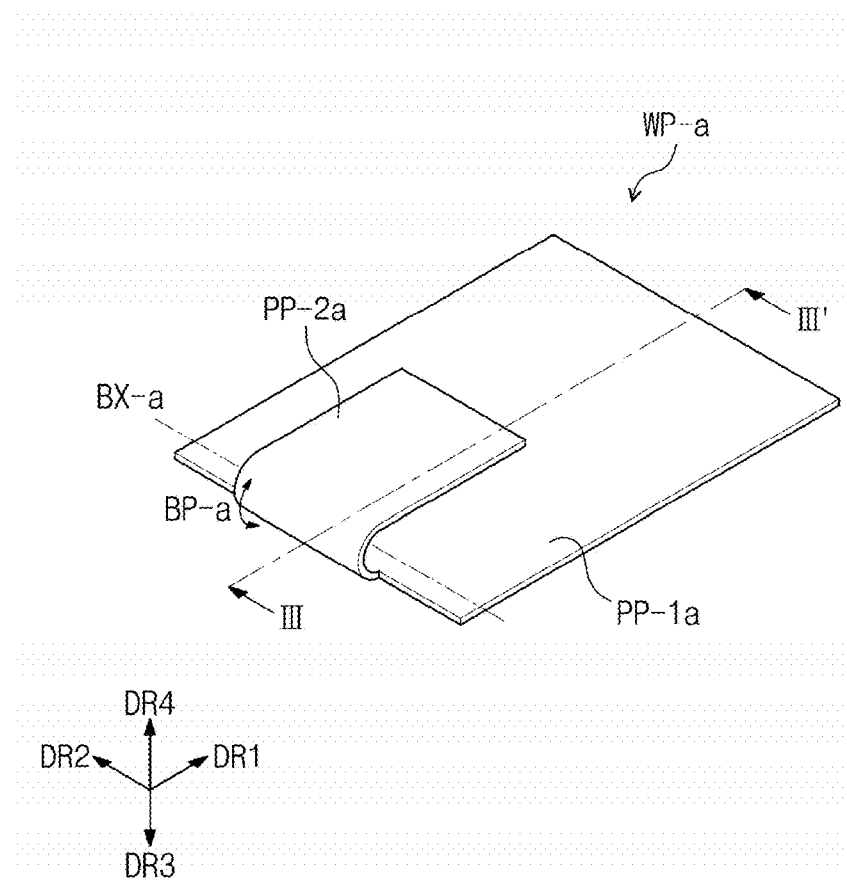
FIG. 4A is a perspective view of another embodiment of a window constructed according to the principles of the invention.
Figure 4B:
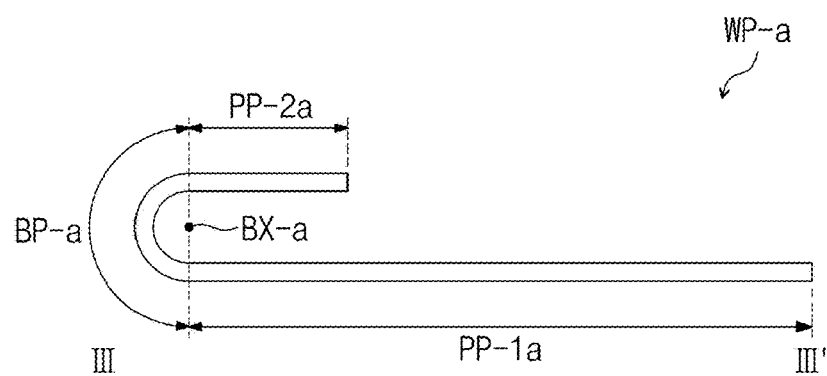
FIG. 4B is a cross-sectional view taken along line of FIG. 4A.

FIG. 4A is a perspective view of the window according to an embodiment, and FIG. 4B is a cross-sectional view taken along line of FIG. 4A. Referring to FIGS. 4A and 4B, a window WP-a may include a first non-bent portion PP-1a and a second non-bent portion PP-2a, which face each other in the direction of the third direction axis DR3 or the fourth direction axis DR4 and a bent portion BP-a disposed between the first non-bent portion PP-1a and the second non-bent portion PP-2a. In the window WP-a the first non-bent portion PP-1a and the second non-bent portion PP-2a may have different surface areas. The second non-bent portion PP-2a may overlap only a portion of the first non-bent portion PP-1a. The first non-bent portion PP-1a may have a surface area greater than that of the second non-bent portion PP-2a. In FIGS. 4A and 4B, the second non-bent portion PP-2a is illustrated as being disposed at a central portion of the first non-bent portion PP-1a, but the embodiments are not limited thereto. For example, in the window WP-a the second non-bent portion PP-2a may lean to one side of the first non-bent portion PP-1a.

In the windows WP and WP-a illustrated in FIGS. 2 to 4B the bending axes BX and BX-a are illustrated generally parallel to each other in the direction of the second direction axis DR2, which is a short side direction of each of the windows WP and WP-a, but the embodiments are not limited thereto. Unlike this, the windows WP and WP-a may include bent portions BP and BP-a that are bent with respect to bending axes BX and BX-a generally parallel to the direction of the first direction axis DR1 that is the long side direction. Also, the shapes of the windows WP and WP-a embodiments are not limited to those illustrated in this specification, and the ratio of the long side and the short side may be changed differently from those illustrated in the drawings.

The shape of the window manufactured by the window molding method using embodiments of the window molding apparatus of the invention is not limited to that illustrated in FIGS. 1 to 4B. In FIGS. 2 to 4B, a case in which the bending angle θ is about 180° is illustrated, but the embodiments are not limited thereto. For example, if the window includes a bent portion bent at a large bending angle of about 120° or more. Here, the window may be provided in various shapes in addition to the shape disclosed in this specification as long as the non-bent portion is provided at each of both sides with respect to the bent portion.

Figure 5:
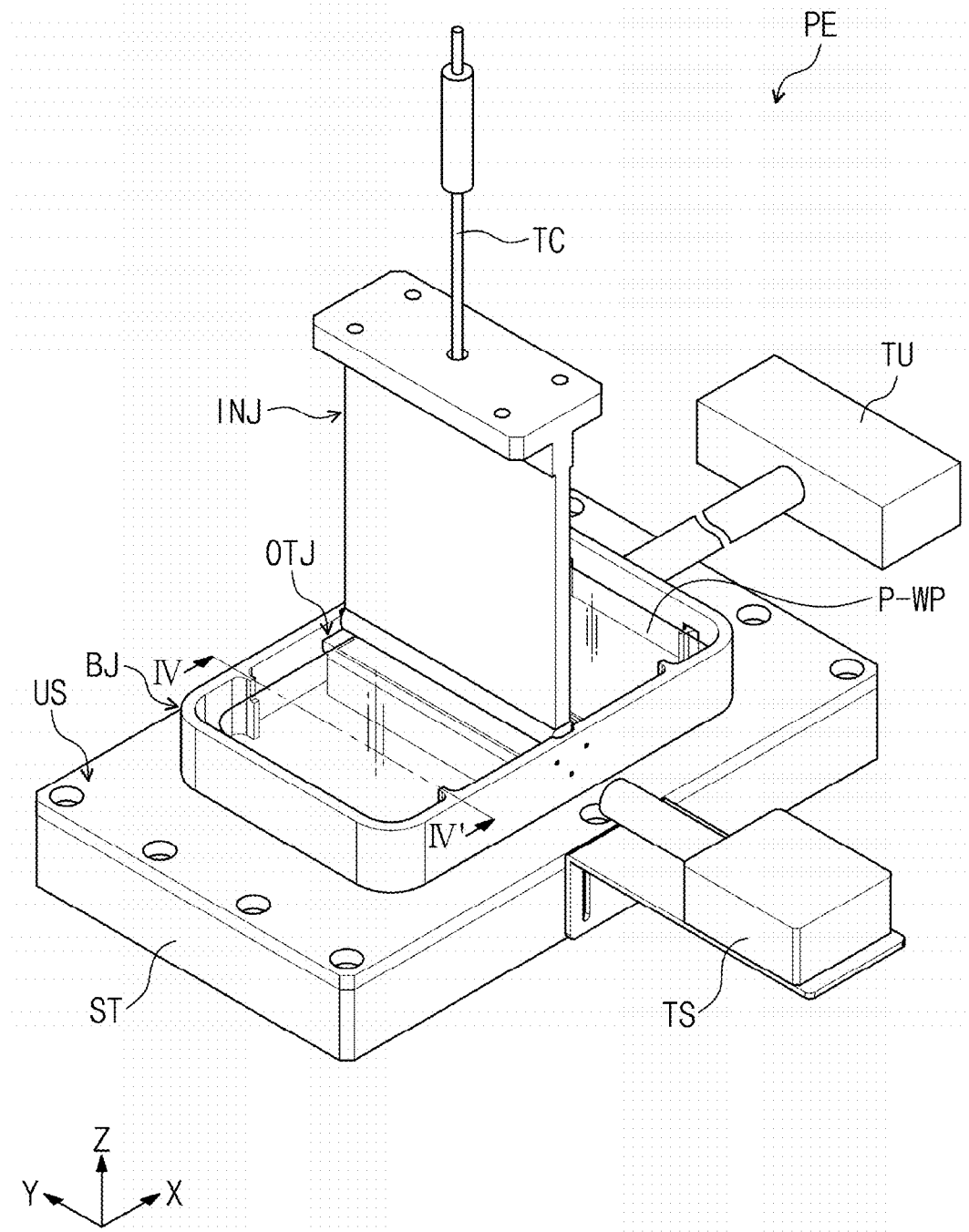
FIG. 5 is a perspective view of an embodiment of a window molding apparatus constructed according to the principles of the invention.
Figure 6:
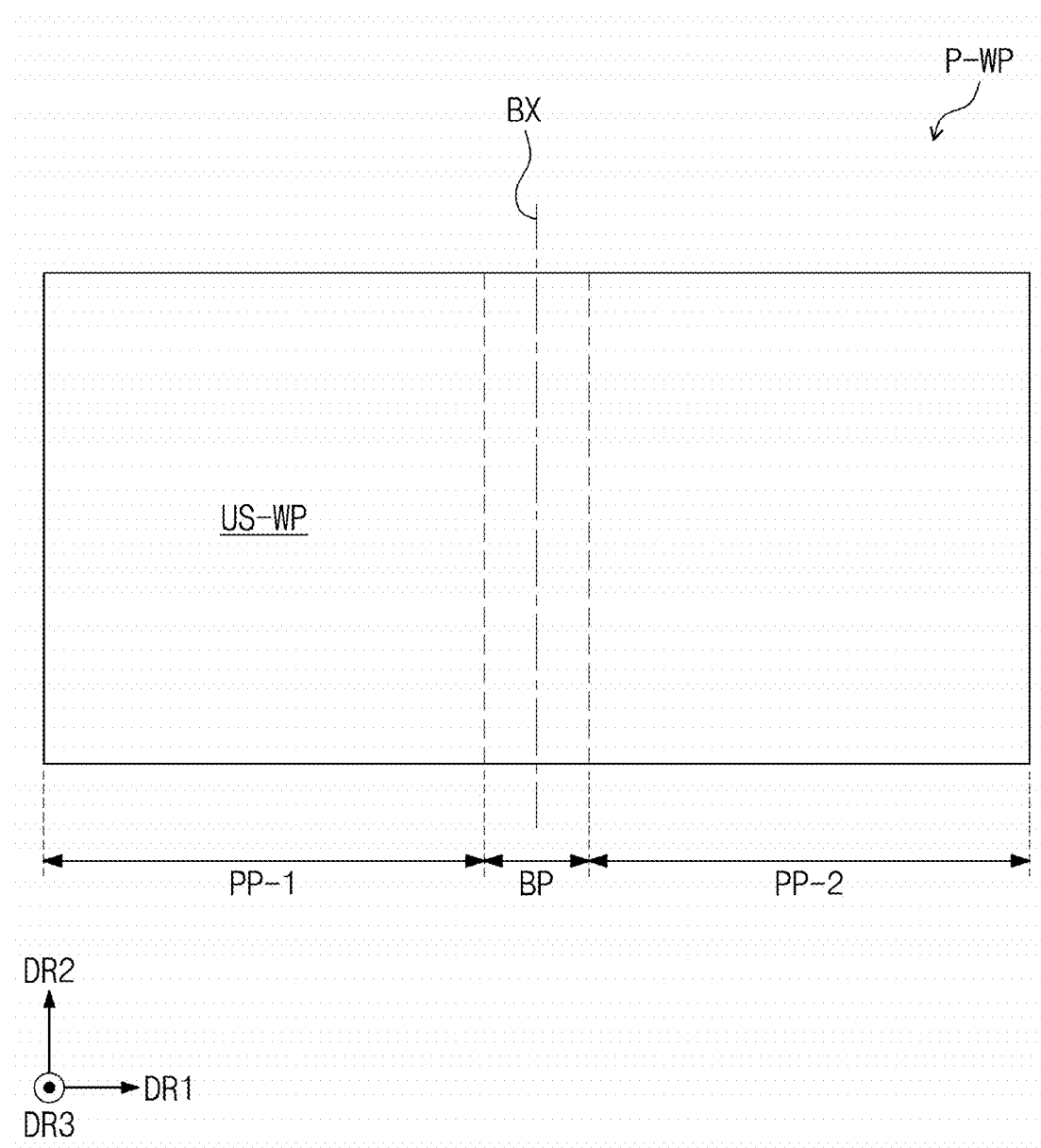
FIG. 6 is a plan view of an embodiment of a member for processing, using the window molding apparatus of FIG. 5.
Figure 7:
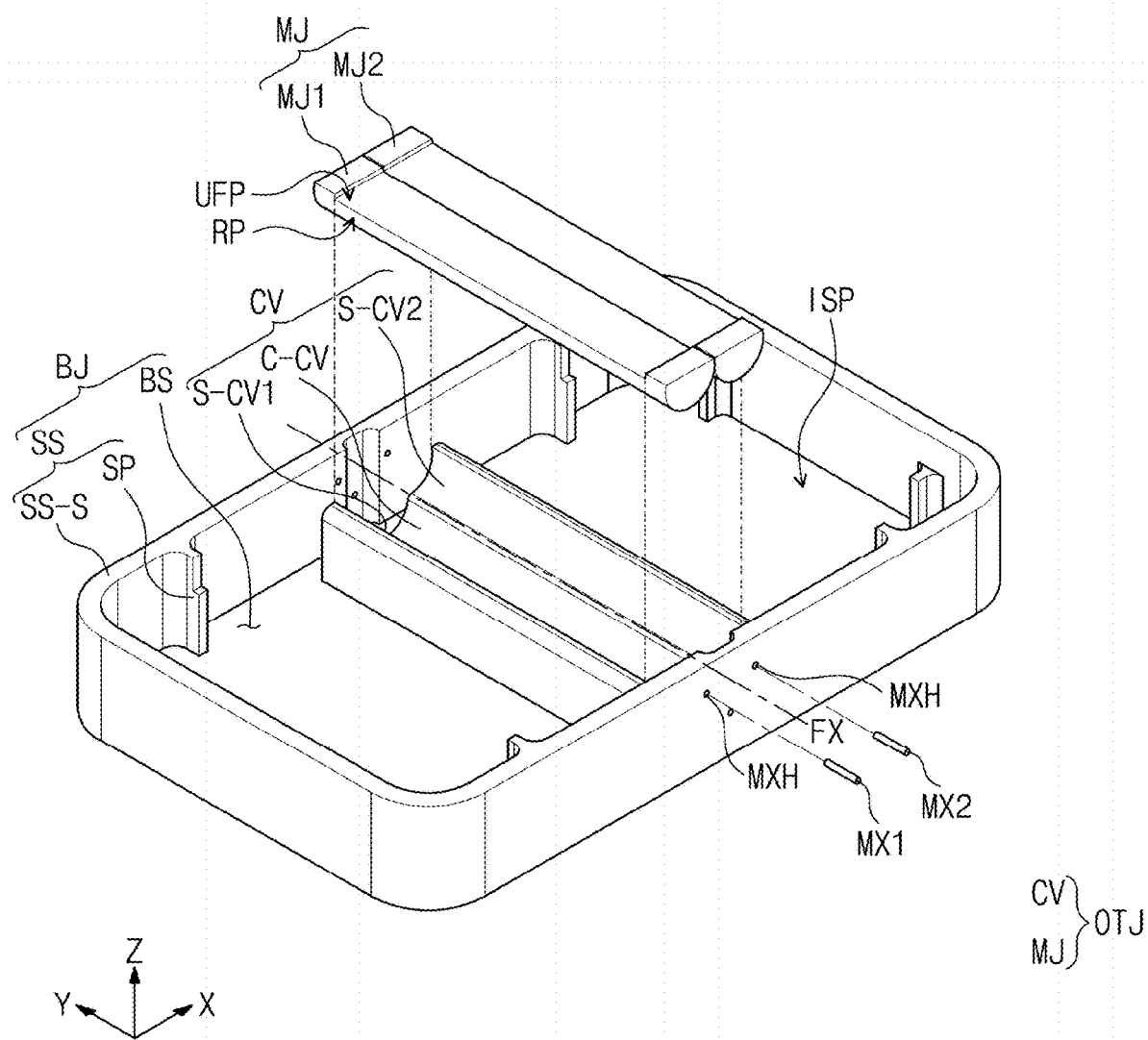
FIG. 7 is a perspective view illustrating a portion of the window molding apparatus of FIG. 6.
Figure 8:
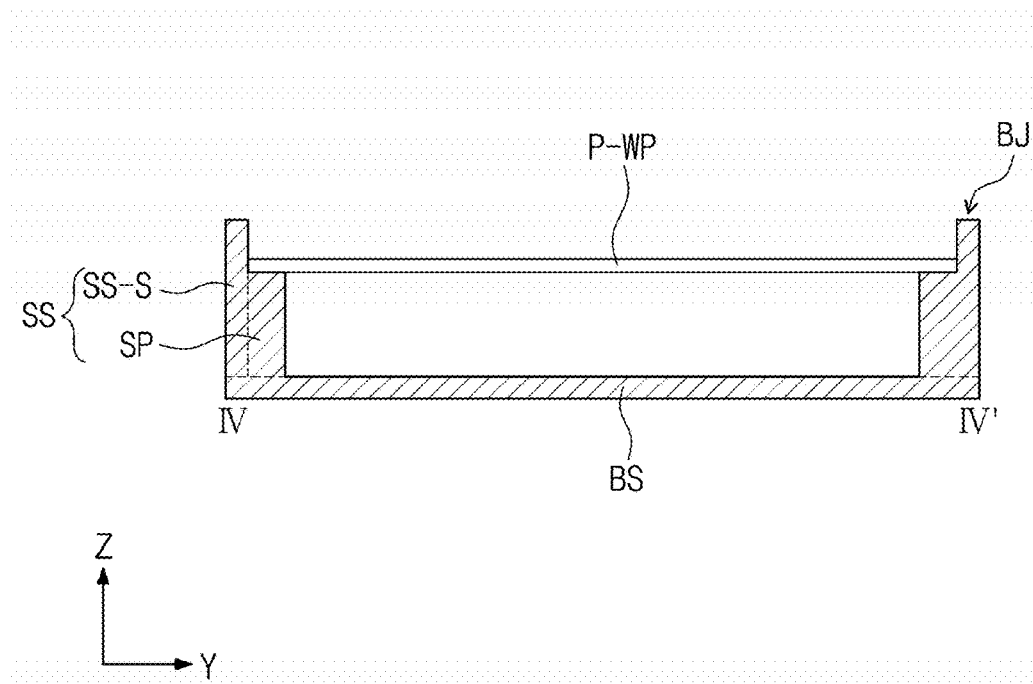
FIG. 8 is a cross-sectional view taken along line IV-IV' of FIG. 5.

FIG. 5 is a perspective view of an embodiment of a window molding apparatus constructed according to the principles of the invention. FIG. 6 is a plan view of an embodiment of a member for processing, using the window molding apparatus of FIG. 5. FIG. 7 is a perspective view illustrating a portion of the window molding apparatus of FIG. 6. FIG. 8 is a cross-sectional view taken along line IV-IV' of FIG. 5. The ratio of the sizes of each of members in the window molding apparatus PE illustrated in this specification is not limited to the illustrated ratios as the drawings are not necessarily to scale. For example, the ratio of the height and width of a jig in the form of a base jig BJ and the outer molding part OTJ, and the height ratio of the base jig BJ and an inner molding part INJ may be changed differently from the illustrated ratios.

The member P-WP to be processed is illustrated in FIG. 6 corresponds to a preliminary work piece before molding to create the bent window therefrom. The member P-WP to be processed by the window molding apparatus PE may be a glass substrate. The glass substrate that is the member P-WP to be processed may have a thickness of about 0.1 mm to about 1.0 mm. The window molding apparatus PE may provide the window WP (see FIG. 2) that is bent at a bending angle greater than about 120° by processing the member P-WP to be processed, which is the glass substrate.

Referring to FIG. 5, the window molding apparatus PE may include an inner molding part INJ, a base jig BJ, and an outer molding part OTJ. The inner molding part INJ may be controlled to operate in a substantially vertical direction. As used herein, the control of the operation in the vertical direction means an operation in an upward (up) or downward (down) direction with respect to a Z-axis Z.

The window molding apparatus PE may include a support table ST, and the base jig BJ may be fixed on the support table ST. An upper surface US of the support table ST on which the base jig BJ is disposed may be generally parallel to a plane defined by an X-axis X and a Y-axis Y. The Z-axis Z may indicate a normal direction to the plane defined by the X-axis X and the Y-axis Y.

The window molding apparatus PE may be disposed in a chamber. An inert gas may be provided into the chamber. For example, a nitrogen ($N_2$) gas may be provided into the chamber. Also, the molding of the window may be performed by increasing atmosphere temperature within the chamber through the window molding method described below.

In the window molding apparatus PE a work piece P-WP to be processed (hereinafter, referred to as a processed member P-WP) may be supported by the base jig BJ. The processed member P-WP before the molding may be disposed between the inner molding part INJ and the outer molding part OTJ.

Referring to FIG. 5, the window molding apparatus PE may include a heating unit TU. The heating unit TU may be connected to the base jig BJ to provide heat to the base jig BJ. Alternatively, the base jig BJ may be directly heated. The base jig BJ may include an induction heating coil.

The window molding apparatus PE may further include a temperature sensor TS. The temperature sensor TS may be spaced apart from the base jig BJ and may be disposed at one side of the base jig BJ. However, the embodiments are not limited thereto, and the temperature sensor TS may be adjacent to the base jig BJ. Alternatively, a plurality of temperature sensors TS may be disposed around the base jig BJ.

The temperature sensor TS may monitor a temperature of the base jig BJ. The temperature sensor TS and the heating unit TU may be connected to each other through a control unit, and the temperature of the base jig BJ sensed by the temperature sensor TS may be used as an input value, and thus, a control unit may control heat provided by the heating unit TU.

The processed member P-WP may be disposed between the inner molding part INJ and the outer molding part OTJ. The inner molding part INJ may be disposed above the processed member P-WP, and the outer molding part OTJ may be disposed below the processed member P-WP. The inner molding part INJ may mold the shape of the window inner side WP-IS (see FIG. 3), and the outer molding part OTJ may mold the shape of the window outer side WP-OS, (see FIG. 3). The window WP (see FIG. 3) including the bent portion BP defined as the window inner side WP-IS (see FIG. 3) having a radius of curvature "$R_I$" and the window outer side WP-OS (see FIG. 3) having a radius of curvature "$R_O$" may be made using the window molding apparatus PE including the inner molding part INJ and the outer molding part OTJ.

In the window molding apparatus PE each of the inner molding part INJ and the outer molding part OTJ may be made of graphite. In addition, the embodiments are not limited thereto, and each of the inner molding part INJ and the outer molding part OTJ may be not only graphite, but also a silicon carbide, a silicon nitride, a molybdenum disilicide ($MoSi_2$), an aluminum oxide, an aluminum nitride (AlN), a zirconia, or a tungsten carbide (WC). However, the embodiments are not limited thereto, and the outer surfaces of the inner molding part INJ and the outer molding part OTJ may be made from any material as long as a material capable of being easily detached from the processed member P-WP after the molding process. In addition, outer surfaces of the inner molding part INJ and the outer molding part OTJ may be subjected to release treatment so as not to be bonded to the processed member P-WP.

Referring to FIG. 7, the base jig BJ may include a bottom surface BS and a plurality of side surfaces SS. The plurality of side surfaces SS may be disposed on the bottom surface BS. The plurality of side surfaces SS may be bent from the bottom surface BS, for example, the bottom surface BS and the side surfaces SS may be integrated with each other. The bottom surface BS may be generally parallel to a plane defined by the X-axis X and the Y-axis Y and may have a generally rectangular shape on the plane. The bottom surface BS on the plane may have a surface area larger than that of the processed member P-WP on the plane.

The side surfaces SS may extend from respective sides of the bottom surface BS having the generally rectangular shape, respectively. The outer molding part OTJ may be disposed in an inner space ISP defined by the four side surfaces SS, which are disposed to respectively correspond to the four sides of the bottom surface BS, and the bottom surface BS. In addition, the processed member P-WP (see FIG. 5) may be disposed in the inner space ISP of the base jig BJ.

Each of the side surfaces SS may include a support portion SP on which the processed member P-WP is seated. The side surfaces SS may include a side support surface SS-S and a support portion SP protruding from the side support surface SS-S toward the inner space ISP. The processed member P-WP (see FIG. 5) may be seated and supported on the support portion SP.

Referring to FIG. 7, the outer molding part OTJ may be disposed in the inner space ISP of the base jig BJ, and the outer molding part OTJ may include a cavity mold CV and a moving mold MJ. In FIG. 7, the moving mold MJ is illustrated as being spaced apart from the cavity mold CV, but the moving molds MJ1 and MJ2 in the window molding apparatus may be disposed to correspond to sub-cavities S-CV1 and S-CV2. In addition, the outer molding part OTJ may be fixed on the base jig BJ. However, the embodiments are not limited thereto.

As used herein, the outer molding part OTJ is illustrated as being disposed at a center of the base jig BJ, but the embodiments are not limited thereto. the outer molding part OTJ may biased toward one side of the base jig BJ, and thus, a position of the bent portion BP (see FIG. 6) of the processed member P-WP may be changed.

Figure 9:
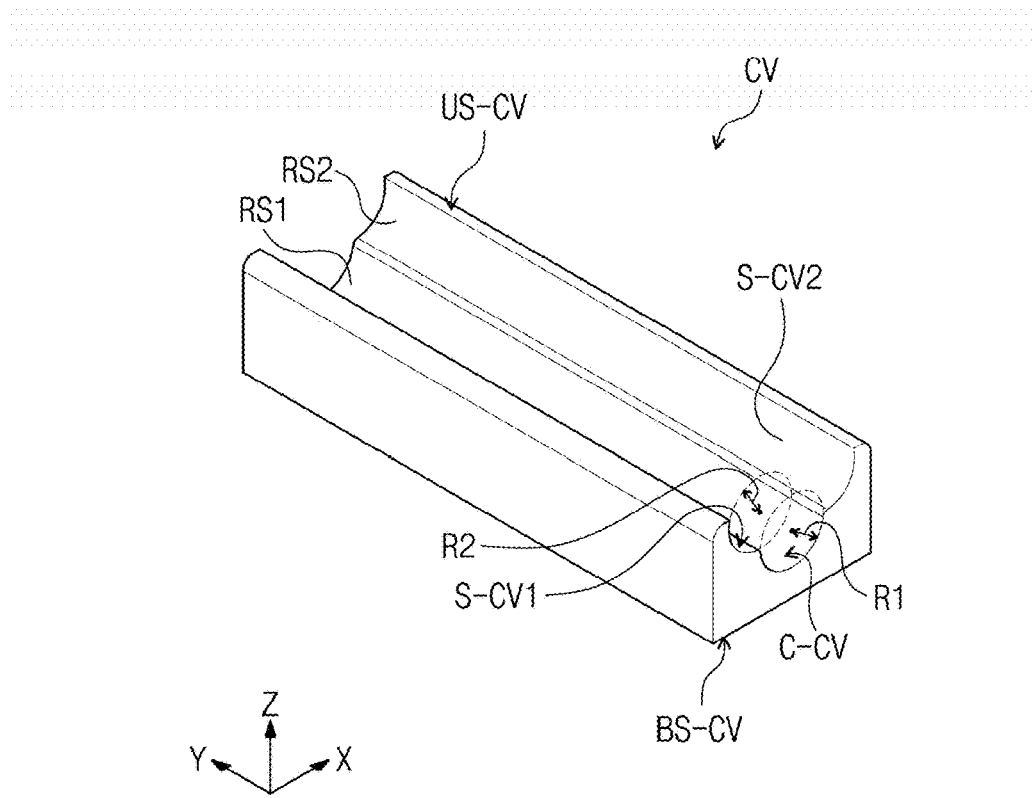
FIG. 9 is a perspective view illustrating another portion of the window molding apparatus of FIG. 6.
Figure 10:
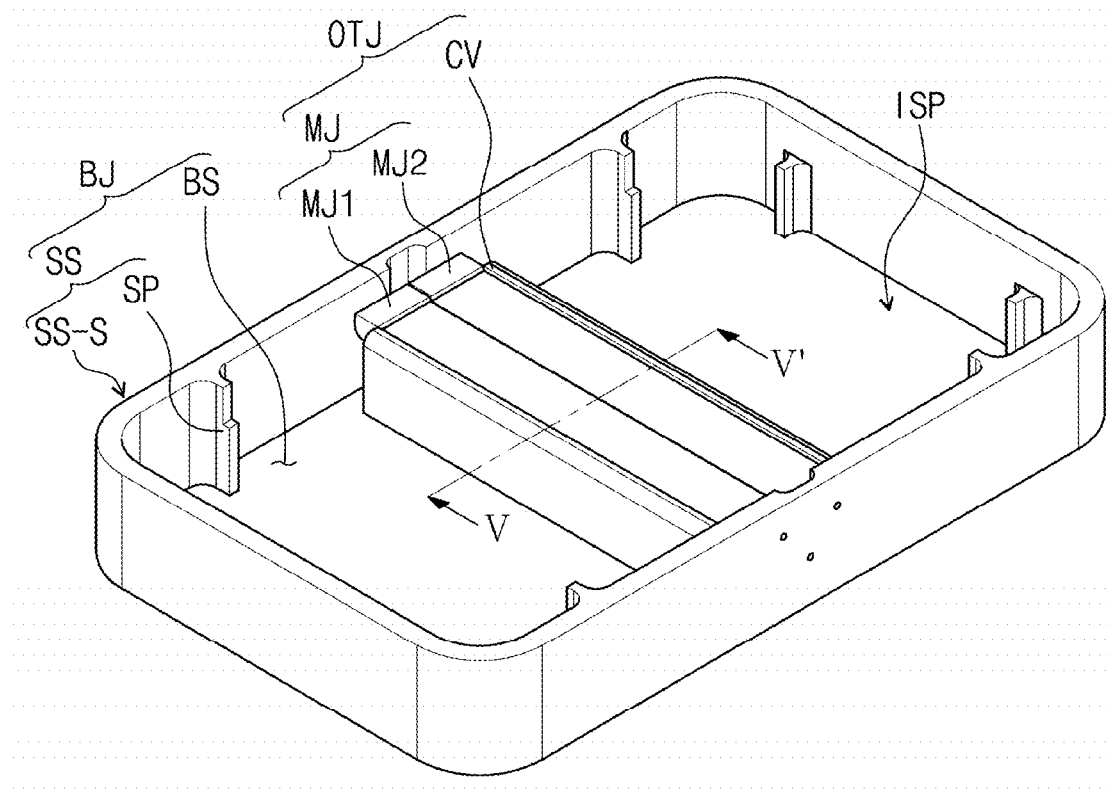
FIG. 10 is a perspective view illustrating another embodiment of the portion of the window molding apparatus shown in FIG. 7.
Figure 11A:
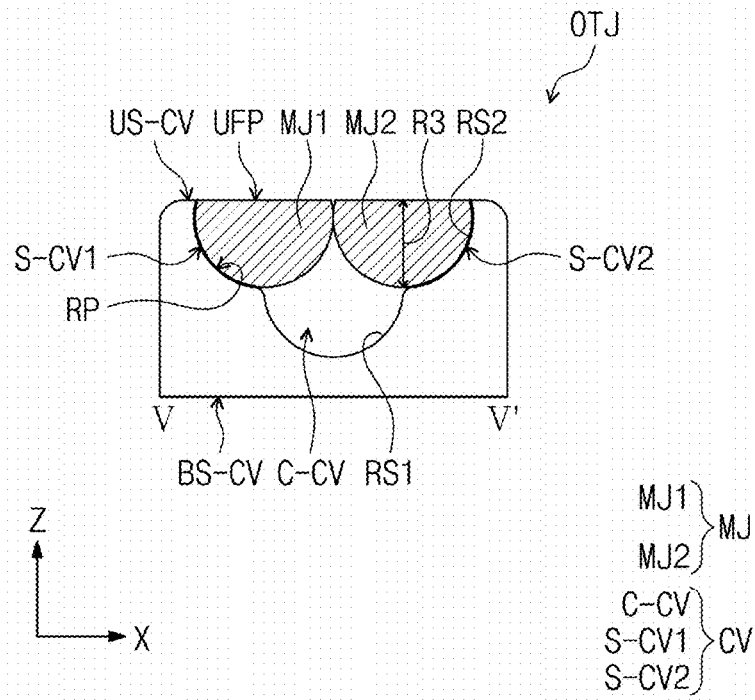
FIG. 11A is a cross-sectional view of an outer molding part taken along line V-V' of FIG. 10.
Figure 11B:
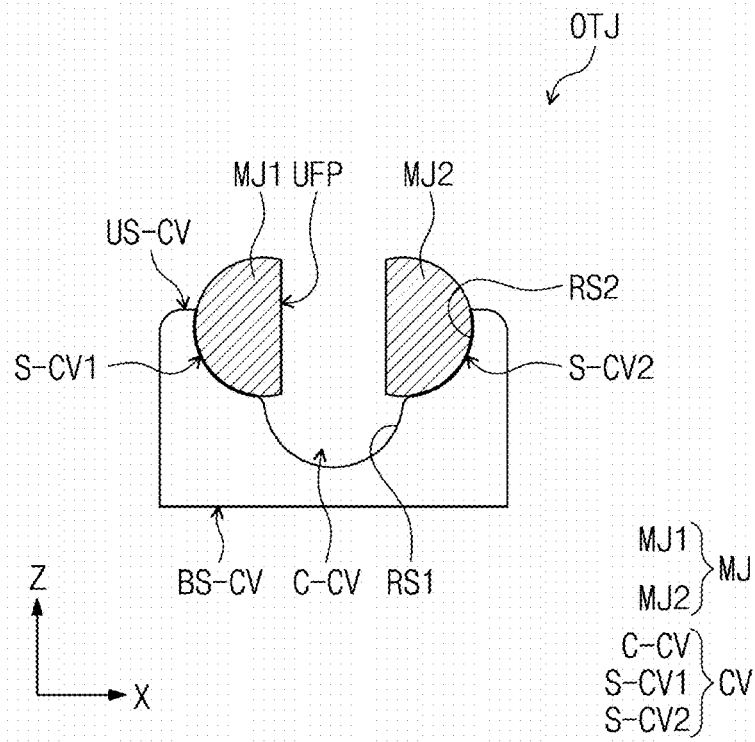
FIG. 11B is a cross-sectional view of an embodiment of the outer molding part of FIG. 11A.

FIG. 9 is a perspective view illustrating another portion of the window molding apparatus of FIG. 6. Particularly, FIG. 9 is a perspective view illustrating the cavity mold CV of the outer molding part. FIG. 10 is a perspective view illustrating another embodiment of the portion of the window molding apparatus shown in FIG. 7. Particularly, FIG. 10 illustrates the window molding apparatus including the base jig BJ and the outer molding part OTJ disposed on the base jig BJ. FIG. 11A is a cross-sectional view of an outer molding part taken along line V-V' of FIG. 10. FIG. 11B is a cross-sectional view of an embodiment of the outer molding part of FIG. 11A.

Referring to FIG. 10, the outer molding part OTJ may include a cavity mold CV and a moving mold MJ. Referring to FIGS. 11A and 11B, the outer molding part OTJ may include a lower surface BS-CV, an upper surface US-CV facing the lower surface BS-CV, a first cavity in the form of a core cavity C-CV defined to have a first curved surface RS1 that is recessed in a direction of the lower surface BS-CV, a plurality of sub-cavities S-CV1 and S-CV2, each defined to have a second curved surface RS2, and a plurality of moving molds MJ1 and MJ2 disposed on the sub-cavities S-CV1 and S-CV2. The sub-cavities S-CV1 and S-CV2 may be defined between the core cavity C-CV and the upper surface US-CV, and the second curved surface RS2 may extend from the core cavity C-CV to the upper surface US-CV.

Referring to the perspective view of FIG. 9 illustrating the cavity mold CV, the first curved surface RS1 defining the core cavity C-CV may have a radius of curvature R1, and the second curved surface RS2 defining each of the sub-cavities S-CV1 and SCV-2 may have a radius of curvature R2. The radius of curvature R2 of the second curved surface RS2 and the radius of curvature R1 of the first curved surface RS1 may be the same or different from each other.

The shape of the outer side WP-OS of the window illustrated in FIG. 3 may correspond to the shape of the first curved surface RS1 of the core cavity C-CV in the window molding apparatus PE. The radius of curvature R1 of the first curved surface RS1 of the core cavity C-CV may correspond to a radius of curvature $R_O$ of the window outer side WP-OS (see FIG. 3). The radius of curvature $R_O$ of the window outer side WP-OS (see FIG. 3) may be less than or equal to the radius of curvature R1 of the first curved surface RS1 of the core cavity C-CV.

Referring to FIGS. 11A and 11B, the moving molds MJ1 and MJ2 may be respectively seated the sub-cavities S-CV1 and S-CV2 to move along the curved surfaces of the sub-cavities S-CV1 and S-CV2. Each of the moving molds MJ1 and MJ2 may include a curved portion RP and a substantially flat portion UFP. The curved portion RP may have a third curved surface corresponding to the second curved surface RS2 of each of the sub-cavities S-CV1 and S-CV2. The radius of curvature R3 of the curved portion RP of each of the moving molds MJ1 and MJ2 may correspond to the radius of curvature R2 of the second curved surface RS2 of each of the sub-cavities S-CV1 and S-CV2. However, the embodiments are not limited thereto, and the radius of curvature R3 of the curved portion RP may be less than or equal to the radius of curvature R2 of the second curved surface RS2. Also, the radius of curvature R3 of the curved portion RP may be greater than the radius of curvature R2 of the second curved surface RS2.

In a first position illustrated in FIG. 11A, the substantially flat portion UFP of each of the moving molds MJ1 and MJ2 and the upper surface US-CV of the cavity mold CV may be disposed side by side. For example, the substantially flat portion UFP of each of the moving molds MJ1 and MJ2 may be disposed in substantially the same plane as the upper surface US-CV of the cavity mold CV. However, the embodiments are not limited thereto, and the substantially flat portion UFP of each of the moving molds MJ1 and MJ2 may further protrude than the upper surface US-CV of the cavity mold CV in the direction of the Z-axis Z, or the upper surface US-CV of the cavity mold CV may further protrude than the substantially flat portions UFP of each of the moving molds MJ1 and MJ2 in the direction of the Z-axis Z. The outer molding part OTJ may include a first sub-cavity S-CV1 and a second sub-cavity S-CV2, which are generally symmetrical with respect to the core cavity C-CV. In addition, the outer molding part OTJ may include a first moving mold MJ1 disposed in the first sub-cavity S-CV1 and a second moving mold MJ2 disposed in the second sub-cavity S-CV2.

The moving molds MJ1 and MJ2 may be controlled in operation so that the substantially flat portion UFP is generally parallel to the lower surface BS-CV of the outer molding part in the first position, and the substantially flat portion UFP is generally perpendicular to the lower surface BS-CV of the outer molding part in the second position. FIG. 11A is a cross-sectional view illustrating an example of the first position, and FIG. 11B is a cross-sectional view illustrating an example of the second position. In FIGS. 11A and 11B, the member to be processed is omitted for clarity in describing an operation of the window molding apparatus.

FIGS. 11A and 11B illustrates the window molding apparatus except for the processed member, but in the first position illustrated in FIG. 11A, the processed member may be disposed on the outer molding part OTJ in a state in which the first non-bent portion PP-1 (see FIG. 6), the bent portion BP (see FIG. 6), and the second non-bent portion PP-2 (see FIG. 6) are substantially flat. Hereinafter, as used herein, in the first position, the first non-bent portion PP-1 (see FIG. 6), the bent portion BP (see FIG. 6), and the second non-bent portion PP-2 (see FIG. 6) are described as being disposed in the substantially flat state on substantially the same plane. In the first position, the processed member P-WP (see FIG. 6) may be disposed in a state of being supported by the substantially flat portion UFP.

In the second position illustrated in FIG. 11B, a portion of the processed member P-WP (see FIG. 6) may be inserted into the cavity mold CV in a state in which the bent portion BP (see FIG. 6) of the processed member P-WP is generally concavely bent into the core cavity C-CV. Hereinafter, as used herein, the second position is described in a state in which the first non-bent portion PP-1 (FIG. 6) and the second non-bent portion PP are bent to face each other with the bent portion BP (see FIG. 6) of the processed member P-WP. The first non-bent portion PP-1 (see FIG. 6) and the second non-bent portion PP-2 (see FIG. 6) may be disposed to face each other between the substantially flat portions UFP of the moving molds MJ1 and MJ2 facing each other in the second position.

Referring to FIGS. 11A and 11B, in the first position, the two moving molds MJ1 and MJ2 may be adjacent to each other so that the substantially flat portion UFP is generally parallel to the lower surface BS-CV of the outer molding part. That is, in the first position, the first moving mold MJ1 and the second moving mold MJ2 may be adjacent to each other below the processed member. In the first position, the substantially flat portions UFP of the first moving mold MJ1 and the second moving mold MJ2 may be generally parallel to each other. That is, in the first position, the bent portion BP (see FIG. 6) of the processed member may overlap the first moving mold MJ1 and the second moving mold MJ2 adjacent to each other.

Also, in the two moving molds MJ1 and MJ2 in the second position, the substantially flat portions UFP may be generally perpendicular to the lower surface BS-CV of the outer molding part. That is, in the second position, the first moving mold MJ1 and the second moving mold MJ2 may move so that the substantially flat portions UFP face each other and thus may be disposed on the first and second sub-cavities S-CV1 and S-CV2. In the second position, the first moving mold MJ1 and the second moving mold MJ2 may be spaced apart from each other to face each other with the first non-bent portion PP-1 (see FIG. 6) and the second non-bent portion PP-2 (see FIG. 6) therebetween. In the second position, the substantially flat portions UFP of the first moving mold MJ1 and the second moving mold MJ2 may be disposed generally perpendicular to the lower surfaces BS-CV.

The embodiments are not limited thereto, and in the second position, the substantially flat portions UFP of the moving molds MJ1 and MJ2 may be disposed to face each other with the processed member P-WP (see FIG. 6) therebetween. Here, each of the substantially flat portions UFP may not be angled at about 90 degrees with respect to the lower surface BS-CV of the outer molding part. In the second position, the inclination angle of the substantially flat portions UFP of the two moving molds MJ1 and MJ2 facing each other with respect to the lower surface BS-CV may not be limited to about 90 degrees. That is, the substantially flat portions UFP of the two moving molds MJ1 and MJ2 facing each other may be changed in a range in which the substantially flat portions UFP are maintained spaced apart from the processed member P-WP (see FIG. 6) while facing each other.

In the window molding apparatus PE N sub-cavities may be defined in the outer molding part OTJ. N may be an even number of 2 or more. Also, the window molding apparatus PE may include N moving molds in the outer molding part OTJ. Each of the N moving molds may be seated in each of the N sub-cavities. However, the embodiments are not limited thereto. For example, each of the N moving molds may not be seated in each of the N sub-cavities, and each of the N moving molds may be fixed and supported on separate fixed shafts. Also, the N moving molds may rotate according to rotation of the fixed shafts. FIG. 7 illustrates a state in which the fixed shafts MX1 and MX2 are separated from the moving molds MJ1 and MJ2, but the fixed shafts MX1 and MX2 may be inserted into fixed groove MXH to fix the moving molds MJ1 and MJ2. The fixed shafts MX1 and MX2 may rotate so that each of the moving molds MJ1 and MJ2 rotate along a virtual rotation axis FX generally parallel to the Y-axis Y.

Figure 12A:
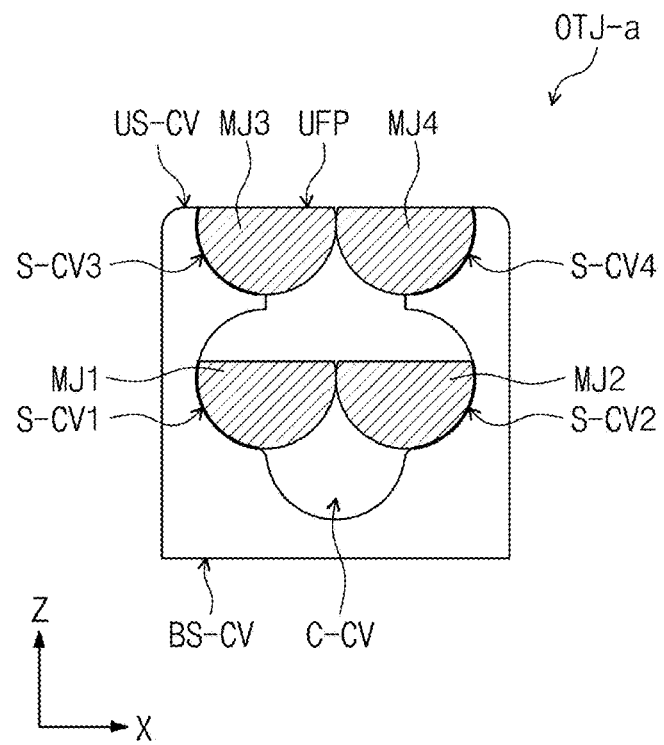
FIG. 12A is a cross-sectional view of another embodiment of the outer molding part.
Figure 12B:
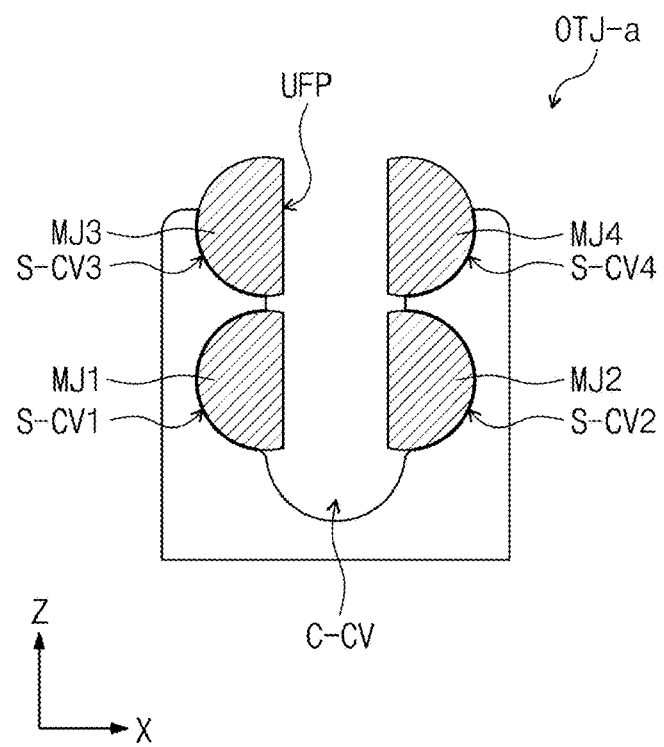
FIG. 12B is a cross-sectional view of another embodiment of the outer molding part.

FIG. 12A is a cross-sectional view of another embodiment of the outer molding part. FIG. 12B is a cross-sectional view of another embodiment of the outer molding part.

FIGS. 12A and 12B illustrate an outer molding part OTJ-a in which four sub-cavities S-CV1, S-CV2, S-CV3, and S-CV4 are defined. That is, in FIGS. 12A and 12B, the outer molding part OTJ-a when N is 4 is illustrated as an example. N sub-cavities S-CV1, and S-CV4 may be defined in the outer molding part OTJ-a. The N sub-cavities S-CV1, . . . , and S-CV4 may be defined in pairs by two. The sub-cavities S-CV1, . . . , and S-CV4, which are defined in pairs by two, may be disposed between the core cavity C-CV and the upper surface US-CV. The outer molding part OTJ-a may include N moving molds MJ1, . . . , and MJ4. The N moving molds MJ1, . . . , and MJ4 may be disposed corresponding to, respectively, the N sub-cavities S-CV1, . . . , S-CV4.

Two pairs of sub-cavities S-CV1 and S-CV2, and S-CV3 and S-CV-4 among the N sub-cavities S-CV1, . . . , and S-CV4 may be generally symmetrical to each other with respect to the core cavity C-CV. The two pairs of sub-cavities S-CV1 and S-CV2, and S-CV3 and S-CV4 may be defined as curved surfaces having substantially the same radius of curvature. Also, all of the N sub-cavities S-CV1, . . . , and S-CV4 may be defined as curved surfaces having substantially the same radius of curvature. However, the embodiment is not limited thereto. The sub-cavities S-CV1 and S-CV3, and S-CV2 and S-CV4 overlapping in the direction of the Z-axis Z, which is a thickness direction, in the first position illustrated in FIG. 12A may be defined as curved surfaces having different curvature radii. That is, each of the sub-cavities S-CV1 and S-CV2, which are defined at an M-th sequence from the core cavity C-CV, among N sub cavities S-CV1, . . . , and S-CV4 may have a radius of curvature different from that of each of the sub-cavities S-CV1 and S-CV2, which are defined at an (M+1)-th sequence from the core cavity C-CV. M may be an integer of 1 or more and N/2 or less.

Figure 12C:
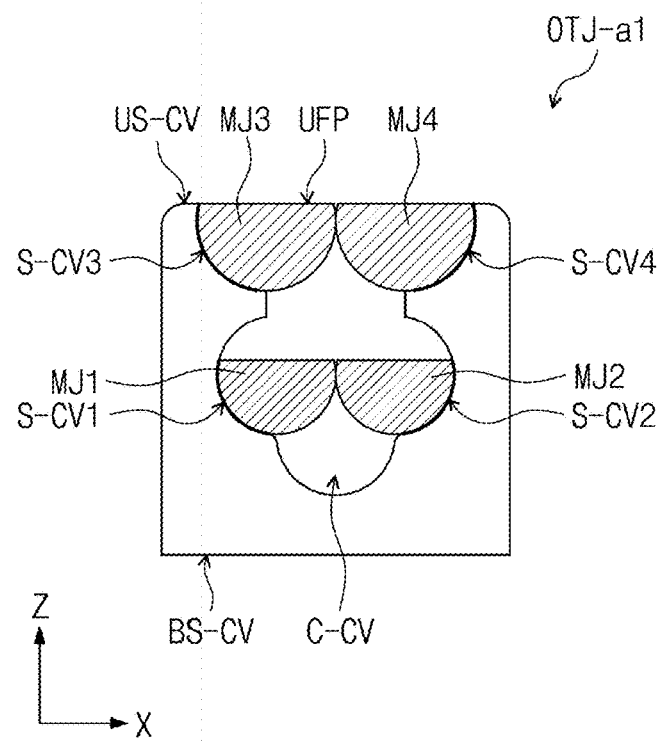
FIG. 12C is a cross-sectional view of yet another embodiment of an outer molding part.
Figure 12D:
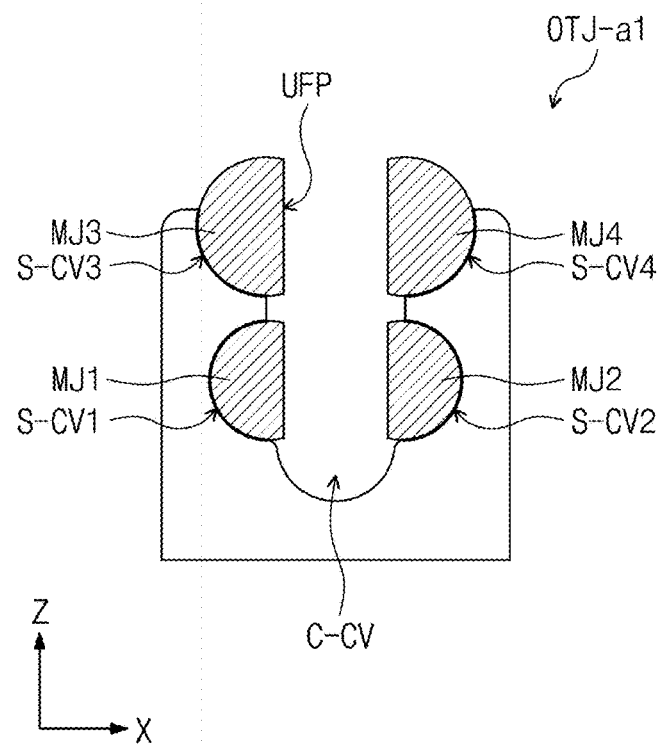
FIG. 12D is a cross-sectional view of the yet another embodiment of the outer molding part.

FIG. 12C is a cross-sectional view of yet another embodiment of an outer molding part. FIG. 12D is a cross-sectional view of the yet another embodiment of the outer molding part.

FIGS. 12C and 12D illustrate an example in which sub-cavities S-CV1 and S-CV3, and S-CV2 and S-CV4 overlapping each other in the direction of the Z-axis Z are defined as curved surfaces having different radii of curvature. FIG. 12C illustrates an example of the outer molding part OTJ-a1 in the first position as illustrated in FIG. 12A, and FIG. 12D illustrates an example of the outer molding part OTJ-a1 in the second position as illustrated in FIG. 12B. Referring to FIGS. 12C and 12D, the third sub-cavity S-CV3 may have a radius of curvature greater than that of the first sub cavity S-CV1, and the fourth sub-cavity S-CV3 may have a radius of curvature greater than that of the second sub-cavity S-CV2. Also, the third moving mold MJ3 may have a size greater than that of the first moving mold MJ1, and the fourth moving mold MJ4 may have a size greater than that of the second moving mold MJ2. The embodiments are not limited thereto, and unlike those illustrated in FIGS. 12A to 12D, each of the upper moving molds may have a size that is relatively less than each of the lower moving molds.

Also, the two sub-cavities S-CV1 and S-CV2, and S-CV3 and S-CV4, which are provided in pairs, may have different curvature radii, and the two sub-cavities S-CV1 and S-CV2, and S-CV3 and S-CV4, which are provided in pairs, may have shapes that are asymmetric to each other. That is, the two moving molds provided in pairs may have different sizes. For example, the first moving mold MJ1 and the second moving mold MJ2 may have sizes different from each other, and the third moving mold MJ3 and the fourth moving mold MJ4 may have sizes different from each other. When the sizes of the moving molds are different the radius of curvature, width, or height of the moving molds are different. The shape and arrangement of the sub-cavities and the moving molds in the window molding apparatus embodiments are not limited to those described with reference to FIGS. 12A to 12D. The plurality of moving molds may be variously combined depending on the shape of the processed member, for example, the moving molds having substantially the same size may be laminated in pairs or may be symmetrically arranged so that at least one of the plurality of moving molds has a size different from that of each of other moving molds.

Referring to FIG. 12A, in the first position, the moving molds MJ1, . . . , and MJ4 may be adjacent to each other so that the substantially flat portions UFP is generally parallel to the lower surface BS-CV of the outer molding part. That is, in the first position, the first moving mold MJ1 and the second moving mold MJ2 may be adjacent to each other, and the third moving mold MJ3 and the fourth moving mold MJ4 may be adjacent to each other below the processed member P-WP (see FIG. 6). Referring to FIG. 12A, in the first position, the first moving mold MJ1 and the third moving mold MJ3 may be overlap each other, and the second moving mold MJ2 and the fourth moving mold MJ4 may be overlap each other.

Referring to FIG. 12B, the two moving molds MJ1 and MJ2, and MJ3 and MJ4 provided in pairs in the second position may be spaced apart from each other to face each other. The moving molds and MJ4 may move along the curved surfaces of the corresponding sub-cavities S-CV1, . . . , and S-CV4 so that the substantially flat portions UFP of the pairs of moving molds MJ1 and MJ2, and MJ3 and MJ4 face each other. In the second position, the first moving mold MJ1 and the second moving mold MJ2 may be spaced apart from each other to face each other with the first non-bent portion PP-1 (see FIG. 6) and the second non-bent portion PP-2 (see FIG. 6) therebetween, and the third moving mold MJ3 and the fourth moving mold MJ4 may be spaced apart from each other to face each other with the first non-bent portion PP-1 (see FIG. 6) and the second non-bent portion PP-2 (see FIG. 6) therebetween. In the second position, the first moving mold MJ1 and the third moving mold MJ3 may overlap each other, and the second moving mold MJ2 and the fourth moving mold MJ4 may overlap each other. In the second position, the substantially flat portions UFP of the moving molds MJ1, . . . , and MJ4 may be arranged to be generally perpendicular to the lower surface BS-CV, but the embodiments are not limited thereto.

When the apparatus is changed from the first position to the second position, it may sequentially operate in order from the M-th moving molds to the moving molds adjacent to the core cavity. Referring to FIGS. 12A to 12B, the third moving mold MJ3 and the fourth moving mold MJ4 may respectively move along the curved surfaces of the third sub-cavity S-CV4 and the fourth sub-cavity S-CV4 to face each other while being changed from the first position illustrated in FIG. 12A to the second position illustrated in FIG. 12B. Thereafter, the moving mold MJ1 and the second moving mold MJ2 may respectively move along the curved surfaces of the first sub-cavity S-CV1 and the second sub-cavity S-CV2 to face each other.

In FIGS. 12A and 12B, a case in which the four sub-cavities and the four moving molds are provided has been exemplarily described, but the embodiments are not limited thereto. For example, the window molding apparatus may include six or more sub-cavities and six or more moving molds, which are arranged respectively corresponding to the sub-cavities. In even this case, components described in FIGS. 11A to 12B may be applied in substantially the same manner.

Figure 13A:
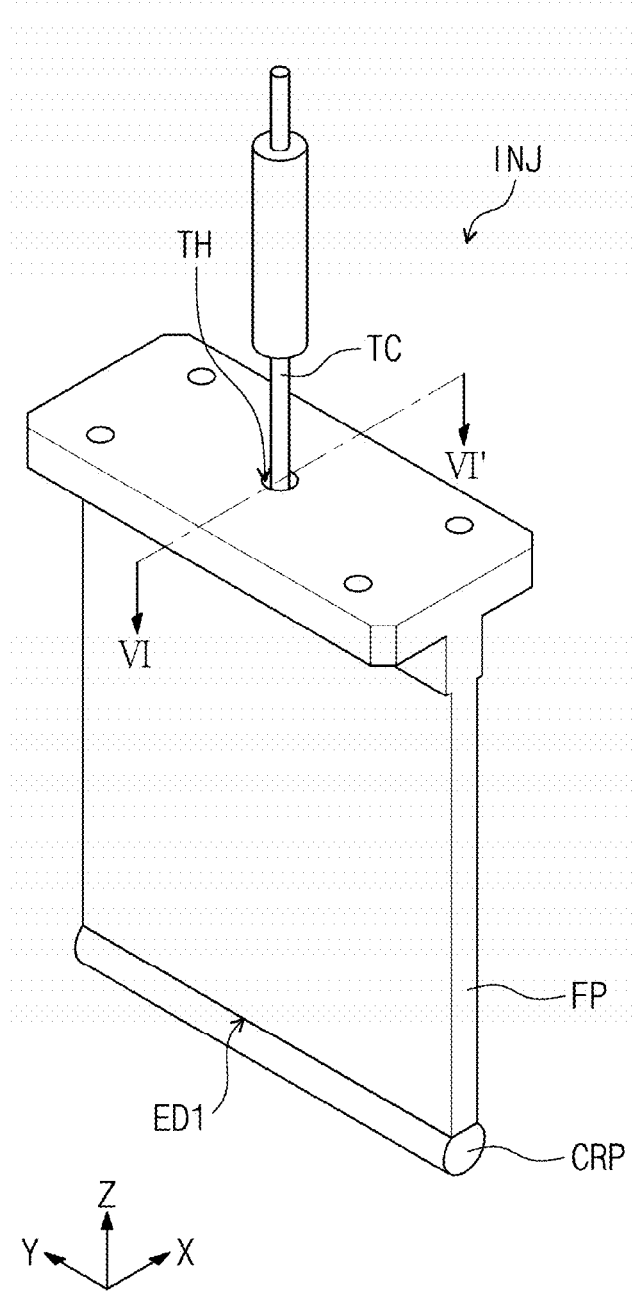
FIG. 13A is a perspective view of an embodiment of an inner molding part constructed according to the principles of the invention.
Figure 13B:
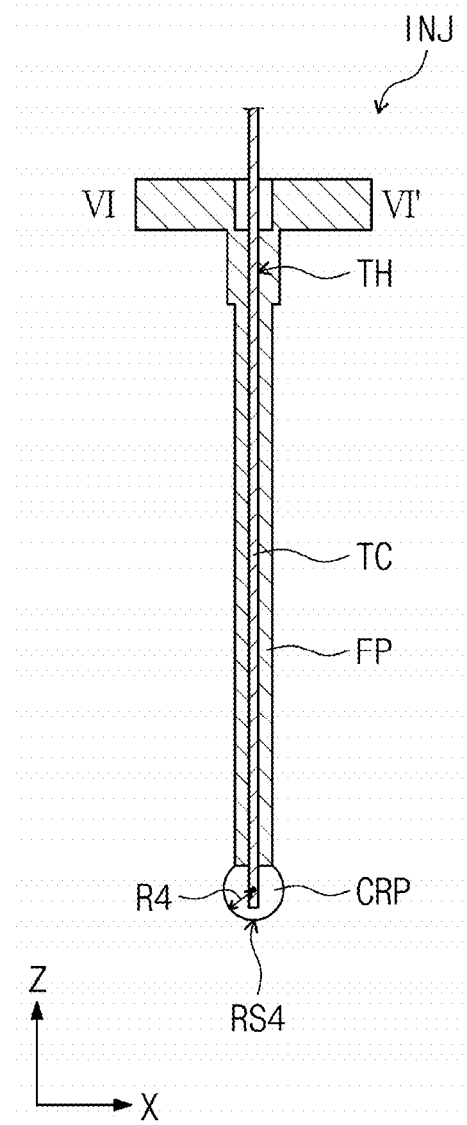
FIG. 13B is a cross-sectional view taken along line VI-VI' of FIG. 13A.

FIG. 13A is a perspective view of an embodiment of an inner molding part constructed according to the principles of the invention. FIG. 13B is a cross-sectional view taken along line VI-VI' of FIG. 13A.

Referring to FIGS. 13A and 13B, the inner molding part INJ may include a substantially flat molding part FP and a core molding part CRP. The core molding part CRP may be disposed at one end ED1 of the substantially flat molding part FP. The substantially flat molding part FP may be a portion provided integrally with the core molding part CRP.

The core molding part CRP may have a fourth curved surface RS4. The fourth curved surface RS4 of the core molding part CRP may have a shape corresponding to the first curved surface RS1 (see FIG. 11A) of the core cavity C-CV (see FIG. 11A). The fourth curved surface RS4 may have a radius of curvature R4 less than or equal to the radius of curvature R1 of the first curved surface RS1 (see FIGS. 9 and 11A). The fourth curved surface RS4 may have a radius of curvature R4 greater than or equal to the radius of curvature $R_O$ of the window outer side WP-OS (see FIG. 3) and less than or equal to the radius of curvature R1 of the curved surface defining the core cavity C-CV.

The fourth curved surface RS4 of the core molding part CRP may have mean roughness of about 10 Å or less. For example, the fourth curved surface RS4 of the core molding part CRP may have a mean roughness of about 2 Å to about 5 Å. As used herein, the surface roughness represents arithmetic average roughness. Because the mean roughness of the fourth curved surface RS4 of the core molding part CRP that is in direct contact with the processed member P-WP may be about 10 Å or less, the surface of the inner side of the window WP-IS (see FIG. 3) may have a good mean roughness value at which an additional polishing process is not required.

A through-hole TH may be defined in the inner molding part INJ, and a heating member TC may be inserted in the through-hole TH. The through-hole TH may penetrate through the substantially flat molding part FP and extend to the core molding part CRP. The heating member TC may be disposed inside the substantially flat molding part FP and the core molding part CRP along the through-hole TH. Heat may be provided to the inner molding part INJ by using the heating member TC. For example, the core molding part CRP may be heated by the heat transmitted through the heating member TC, and the heated core molding part CRP may be in contact with the processed member P-WP to transfer the heat to the processed member WP, thereby molding the bent portion BP.

The window molding apparatus PE may further include an operation controller for controlling the vertical operation of the inner molding part INJ. The operation controller may include an operation motor that allows the core molding part CRP to move in the substantially vertical direction or a fixed part that fixes the core molding part CRP. The operation controller may be disposed on an upper portion of the inner molding part INJ or a side surface of the inner molding part INJ and then be connected to the inner molding part INJ.

Figure 14:
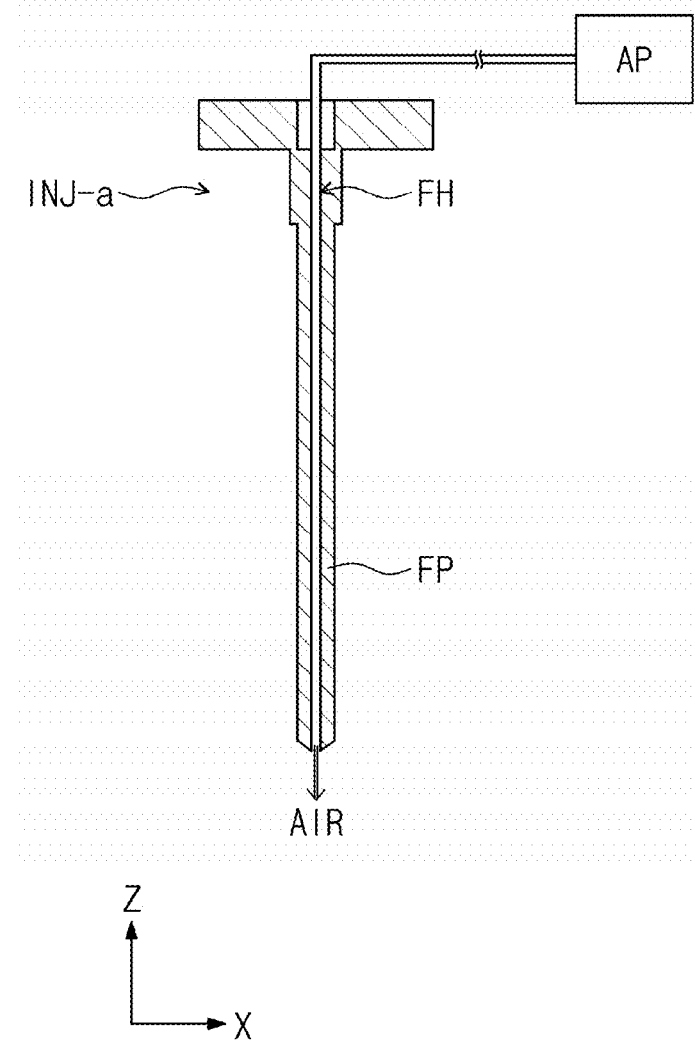
FIG. 14 is a cross-sectional view of another embodiment of the inner molding part.

FIG. 14 is a cross-sectional view of another embodiment of the inner molding part.

A flow path FH may be defined inside the inner molding part INJ-a of FIG. 14. The flow path FH may be defined by passing through an inner molding part INJ-a. Air may be injected from the inner molding part INJ-a to the outer molding part OTJ (see FIG. 5) through the flow path FH defined in the inner molding part INJ-a. The air transferred through the flow path FH may be a heated inert gas having a high temperature. The air transferred through the flow path FH may be provided at a pressure of about 10 kilogram-force (kgf)/cm² or less. For example, the pressure of the air transferred through the flow path FH may range of about 2 kgf/cm² to about 10 kgf/cm².

The window molding apparatus PE may further include a pump in the form of a pressing part AP. The pressing part AP may be a portion configured to supply air to the inner molding part INJ-a. In addition, the pressing part AP may be a portion configured to adjust a pressure of air provided to the inner molding part INJ-a.

When the inner molding part INJ-a of FIG. 14 is used, because the inner molding part INJ-a is not in direct contact with the processed member P-WP (see FIG. 6), the bent portion BP (see FIG. 6) of the processed member P-WP may be molded without damaging the surface of the processed member P-WP. That is, when molding the processed member P-WP (see FIG. 6) using the window molding apparatus PE including the inner molding part INJ-a the window inner side WP-IS (see FIG. 3) may have a good mean roughness value at which an additional polishing process is not required.

Figure 15A:
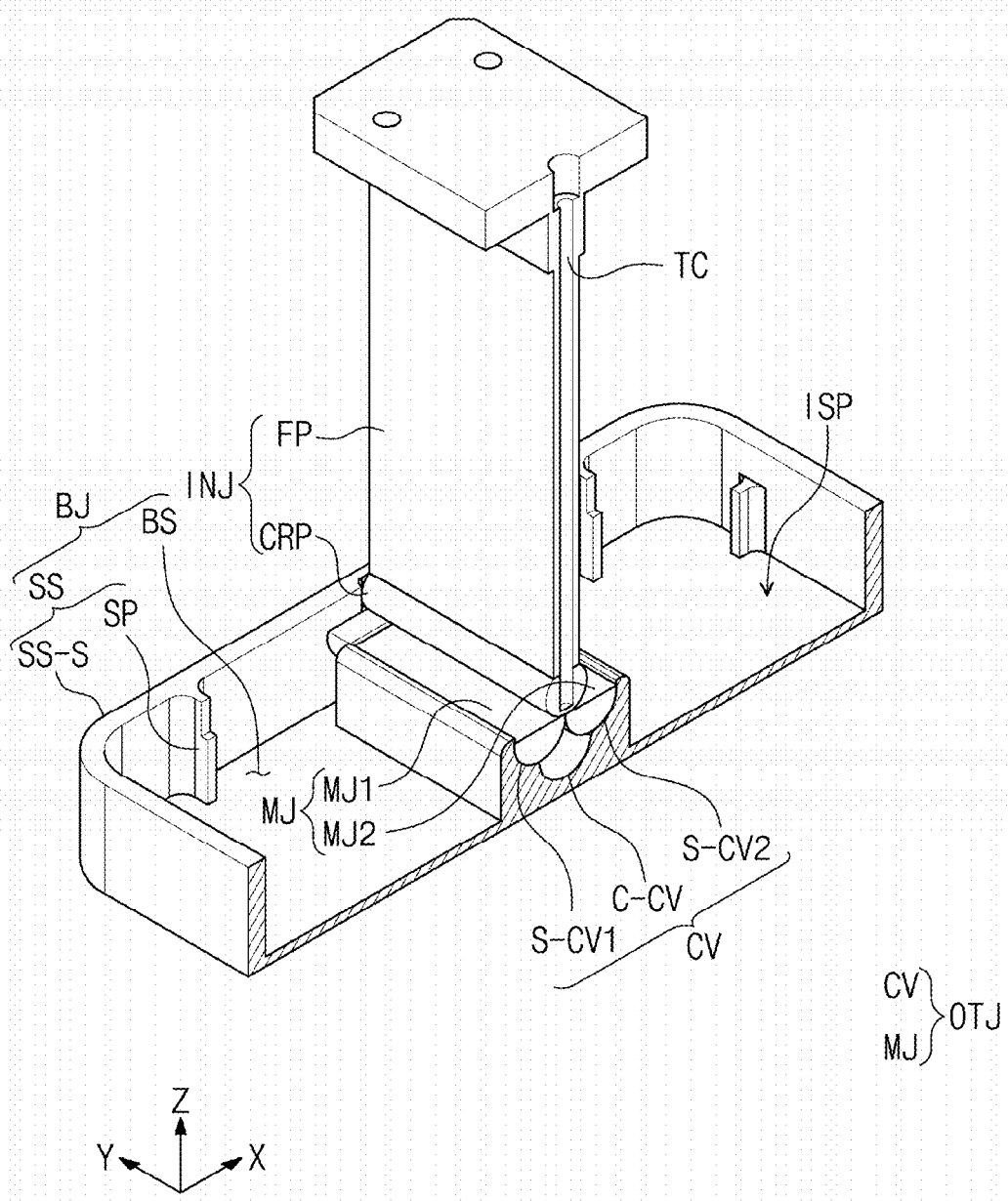
FIG. 15A is a perspective view illustrating of an embodiment a portion of the window molding apparatus in a first position.
Figure 15B:
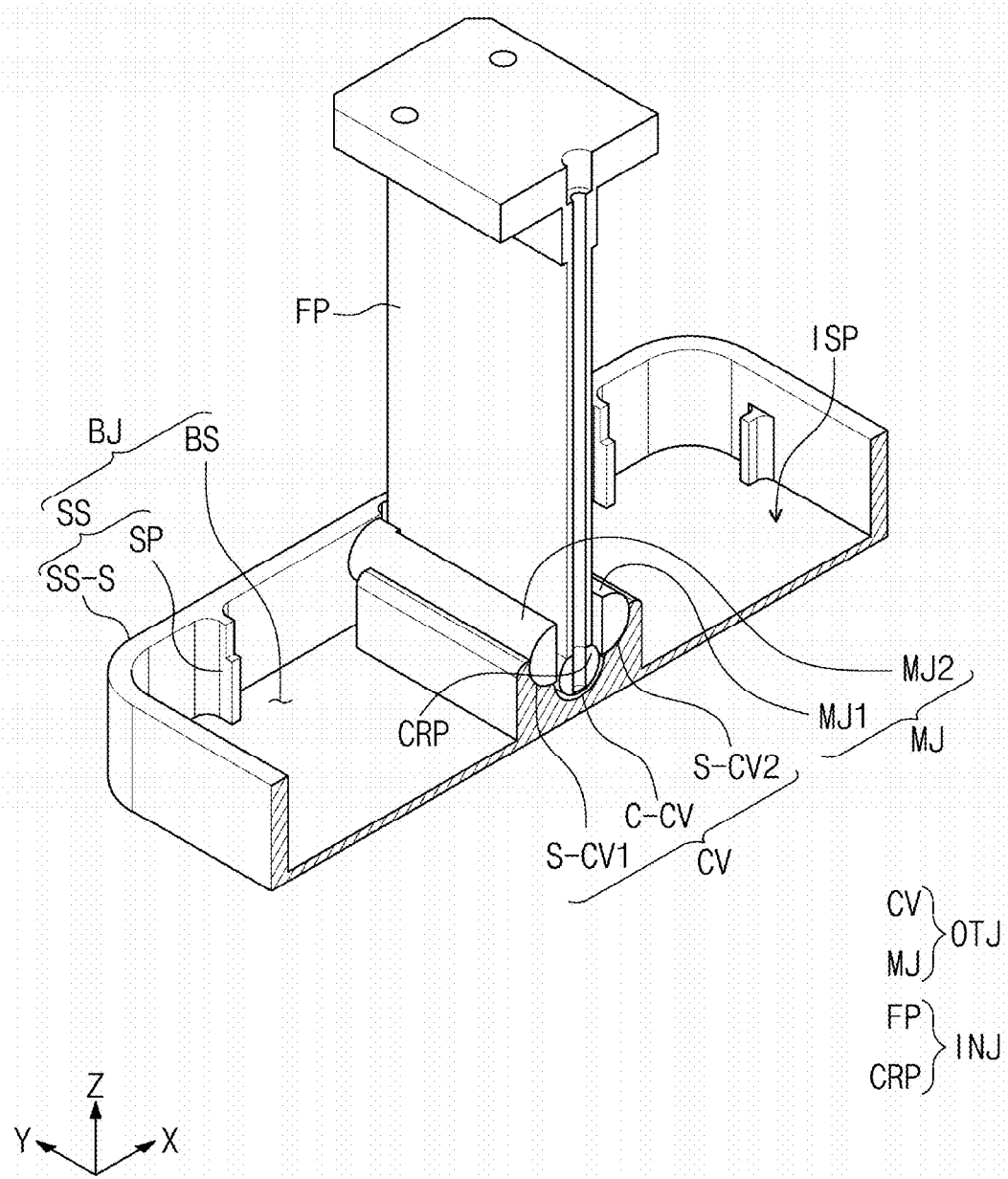
FIG. 15B is another perspective view illustrating the portion of the window molding apparatus of FIG. 15A in a second position.

FIG. 15A is a perspective view illustrating of an embodiment a portion of the window molding apparatus in a first position. FIG. 15B is another perspective view illustrating the portion of the window molding apparatus of FIG. 15A in a second position.

FIGS. 15A and 15B illustrate a cross-section in a state in which the base jig BJ, the outer molding part OTJ, and the inner molding part INJ are partially cut to show a cross-sectional shape of the window molding apparatus. FIG. 15A illustrates a window molding apparatus in the first position, and FIG. 15B illustrates a window molding apparatus in the second position. In FIGS. 15A and 15B, the processed member P-WP is excluded for clarity.

Referring to FIG. 15A, the base jig BJ may be disposed under the inner molding part INJ, and the outer molding part OTJ may be disposed in an inner space ISP of the base jig BJ. The outer molding part OTJ may be disposed on the bottom surface BS of the base jig BJ. The cavity mold CV of the outer molding part OTJ may be fixed to the base jig BJ as a separate constituent. However, the embodiments are not limited thereto, and the cavity mold CV may be provided integrally with the base jig BJ.

In the first position, the inner molding part INJ may be disposed on the moving mold MJ of the outer molding part OTJ. In the outer molding part OTJ, the core cavity C-CV may be spaced apart from the inner molding part INJ, and the moving mold MJ may be seated in the sub-cavities S-CV1 and S-CV2 in a state of being adjacent to the inner molding part INJ. The bent portion BP (see FIG. 6) of the processed member P-WP (see FIG. 6) may be disposed between the moving mold MJ of the outer molding part OTJ and the core molding part CRP of the inner molding part INJ. The upper surface US-WP of the processed member P-WP (see FIG. 6) may be in contact with the core molding part CRP, and the lower surface of the processed member P-WP (see FIG. 6) may be in contact with the moving mold MJ. The processed member P-WP (see FIG. 6) may be modified up to a viscosity range in which the processed member P-WP is easily molded by receiving heat transferred from the core molding part CRP and the moving mold MJ.

Referring to FIG. 15B, the inner molding part INJ may be inserted into a space defined between the core cavity C-CV and the moving molds MJ1 and MJ2 facing each other. In the second position, the core molding part CRP of the inner molding part INJ may be disposed in the core cavity C-CV corresponding to the core cavity C-CV. The first moving mold MJ1 and the second moving mold MJ2 may move along the curved surfaces of the first sub-cavity S-CV1 and the second sub-cavity S-CV2 so as to be spaced apart from each other to face each other. Here, the substantially flat molding part FP of the inner molding part INJ may be disposed into a space between the first moving mold MJ1 and the second moving mold MJ2, which are spaced apart from each other to face each other.

The processed member P-WP (see FIG. 6) may be disposed between the outer molding part OTJ and the inner molding part INJ in a bent state in the second position illustrated in FIG. 15B. The bent portion BP (see FIG. 6) of the processed member P-WP (see FIG. 6) may be in contact with the core cavity C-CV at the outside and in contact with the core molding part CRP at the inside. The first non-bent portion PP-1 and the second non-bent portion PP-2 may face each other with the substantially flat molding part FP therebetween.

When the window molding apparatus PE includes the inner molding part INJ-a of FIG. 14, the inner molding part INJ-a may be spaced apart from the processed member P-WP (see FIG. 6) even in the second position. The window molding apparatus may form the bent portion BP (see FIG. 6) of the processed member P-WP (see FIG. 6) by using high-temperature air supplied through the flow path FH of the inner molding part INJ-a without being in contact with the processed member P-WP (see FIG. 6).

Figure 16:
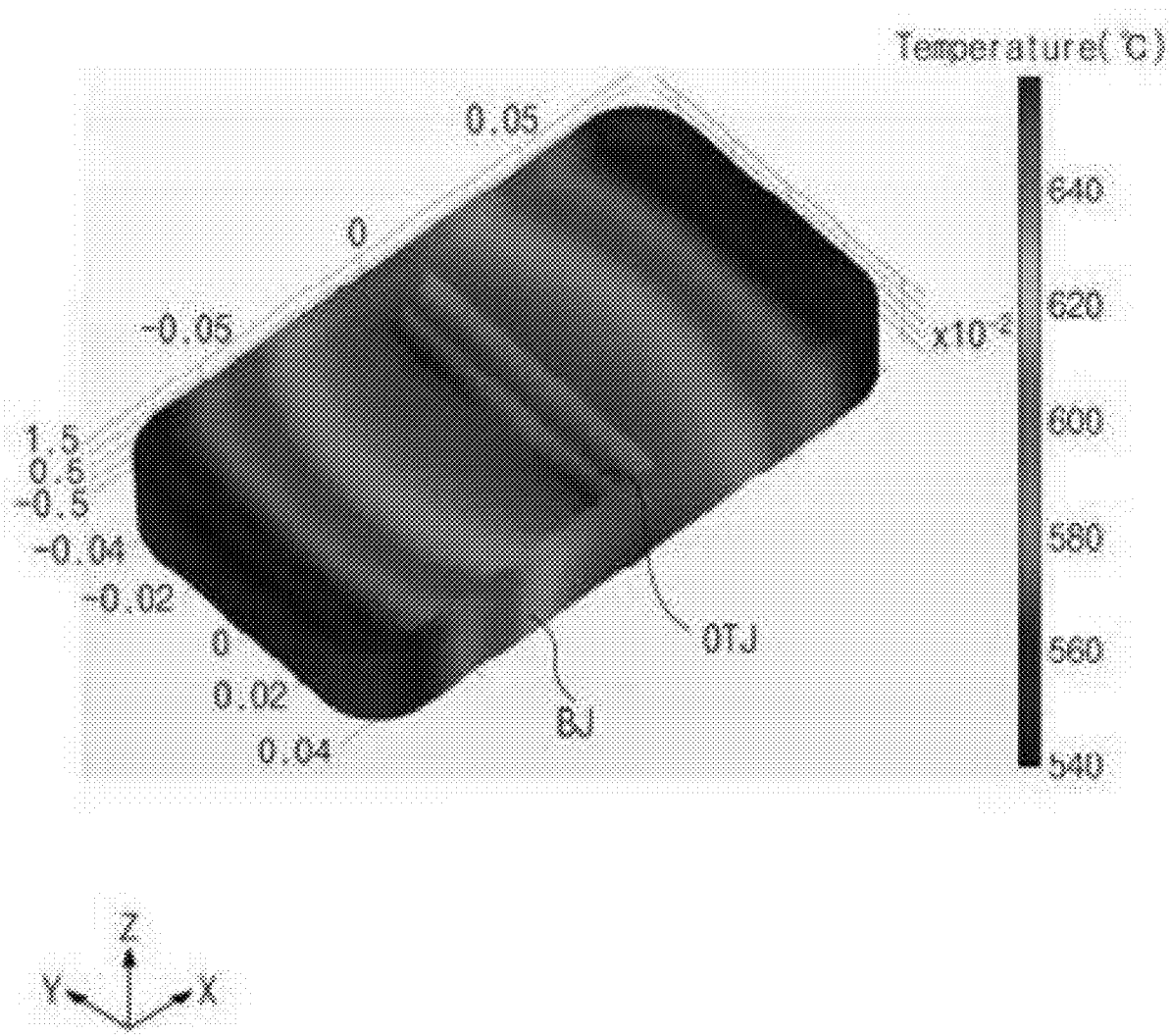
FIG. 16 is a perspective view illustrating a temperature profile at a portion of a window molding apparatus constructed according to the principles of the invention.

FIG. 16 is a perspective view illustrating a temperature profile at a portion of a window molding apparatus constructed according to the principles of the invention.

FIG. 16 is a view illustrating a temperature profile of the base jig BJ and the outer molding part OTJ in the window molding apparatus. Referring to a temperature scale bar, it is seen that the temperature is highest at the outer molding part OTJ and an intermediate portion of the base jig BJ on which the outer molding part OTJ is disposed, and the temperature gradually decreases in a direction that is away from the outer molding part OTJ. That is, it is seen that the temperature of the window molding apparatus is highest at the bent portion BP (see FIG. 6) of the processed member P-WP (see FIG. 6) and a portion adjacent to the bent portion BP, and the temperature gradually increases as being spaced apart from the bent portion BP (see FIG. 6). The maximum temperature in the outer molding part OTJ may be about 640° C. or more. However, the embodiments are not limited thereto, and when the processed member P-WP (see FIG. 6) is a glass substrate, the temperature of the outer molding part OTJ may be controlled so that viscosity of the glass substrate is in the range of about $10^7$ poises to about $10^9$ poises.

As described above, embodiments of the window molding apparatus may include a first molding part in the form of an inner molding part and a second molding part in the form of an outer molding part including a plurality of cavities and moving molds and thus be used for manufacturing a window including two substantially flat portions facing each other between at least one bent portion. The window molding apparatus may include both the inner molding part and the outer molding part including a moving mold disposed below the inner molding part that moves as the processed member is molded and thus is used for simultaneously bending the inside and outside surfaces of the window. In addition, the window molding apparatus may be used for manufacturing a window that is bent at an angle of about 180° with improved dimensional stability and window surface quality by simultaneously molding the inside and outside of the window.

Hereinafter, a method of molding a window according to an embodiment will be described with reference to FIGS. 17 to 20B. A window molding method, which will be described below, may correspond to a window molding method using the window molding apparatus according to one or more of the foregoing embodiments. Hereinafter, in the description of the window molding method, repetitive description of the window molding apparatus will be omitted to avoid redundancy, and differences therebetween will be mainly described.

Figure 17:
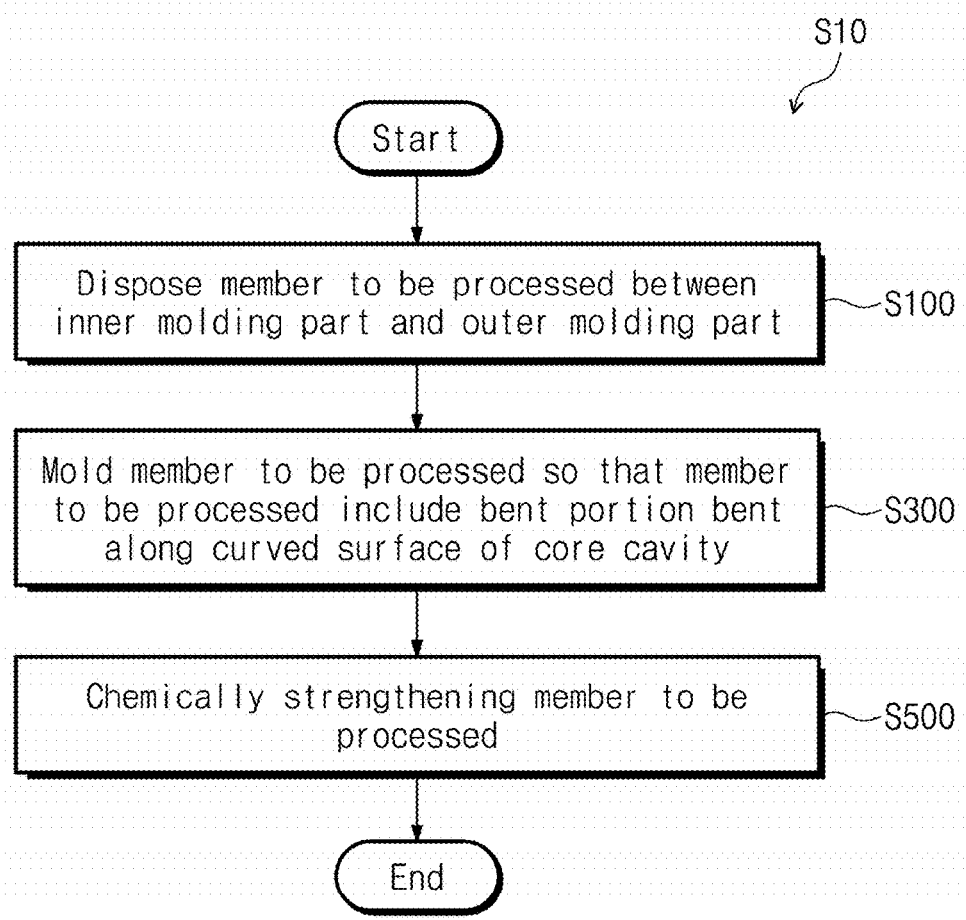
FIG. 17 is a flowchart illustrating an embodiment of a window molding method according to the principles of the invention.
Figure 18:
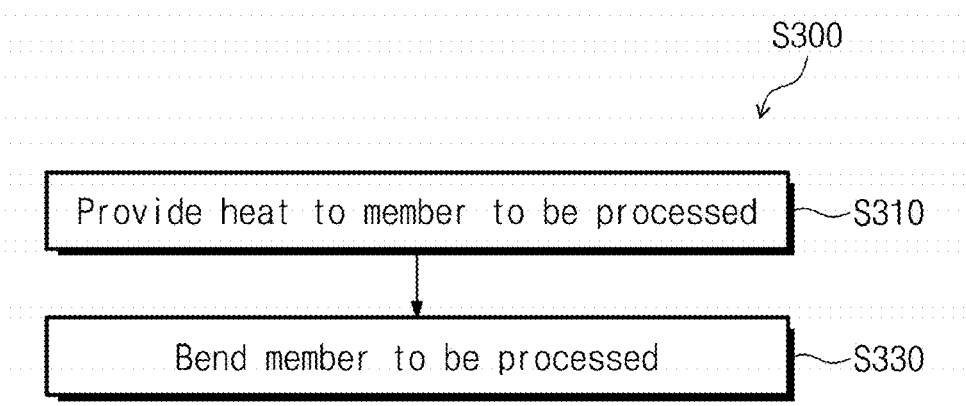
FIG. 18 is a flowchart illustrating an embodiment of a process of the window molding method according to the principles of the invention.
Figure 19A:
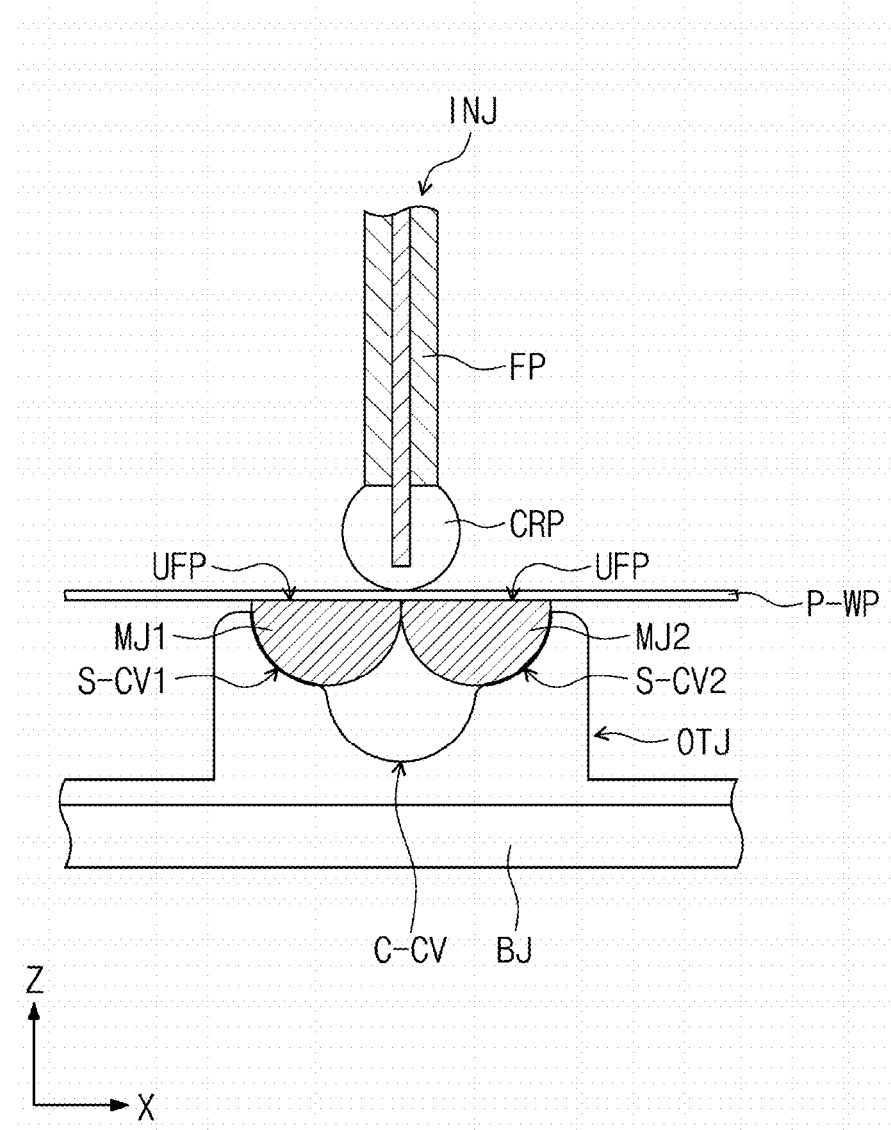
FIG. 19A is a cross-sectional view illustrating one step in a process of a window molding method according to the principles of the invention.
Figure 19B:
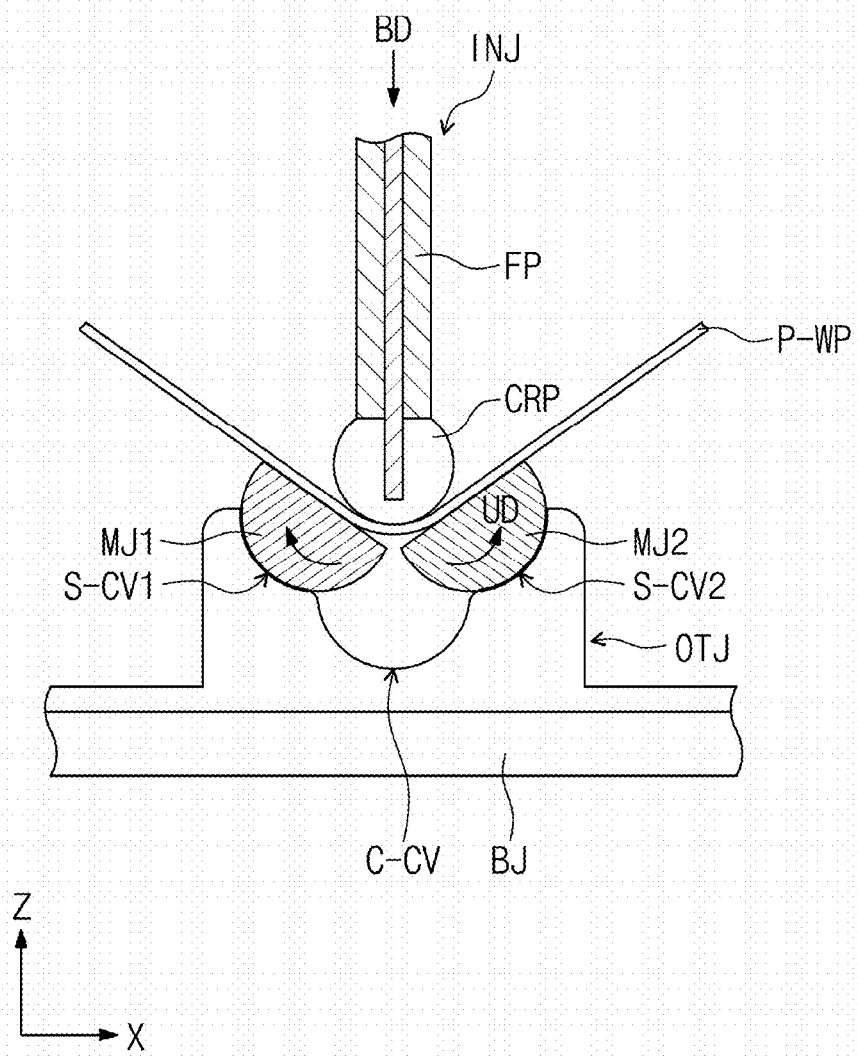
FIG. 19B is a cross-sectional view illustrating another step in the process of the window molding method of FIG. 19A.
Figure 19C:
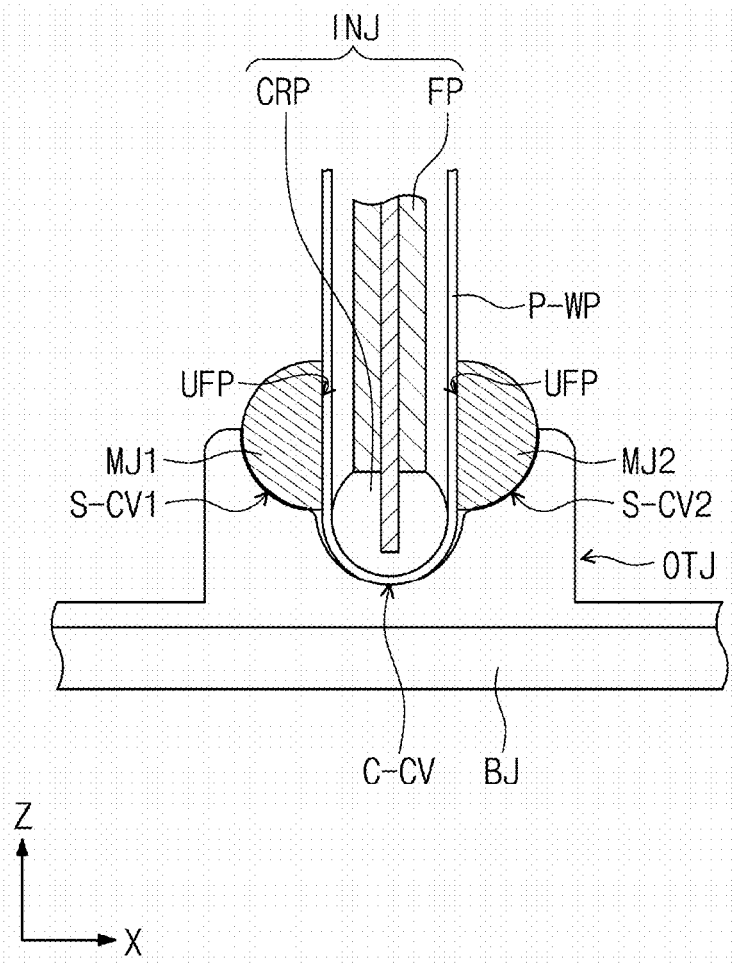
FIG. 19C is a cross-sectional view illustrating a further step in the process of the window molding method of FIG. 19A.

FIG. 17 is a flowchart illustrating an embodiment of a window molding method according to the principles of the invention. FIG. 18 is a flowchart illustrating an embodiment of a process of the window molding method according to the principles of the invention. FIG. 19A is a cross-sectional view illustrating one step in a process of a window molding method according to the principles of the invention. FIG. 19B is a cross-sectional view illustrating to another step in the process of the window molding method of FIG. 19A. FIG. 19C is a cross-sectional view illustrating a further step in the process of the window molding method of FIG. 19A.

The window molding method may be performed using the window molding apparatus according to one or more of the above-described embodiments including the inner molding part INJ and the outer molding part OTJ.

A window molding method (S10) may include a process (S100) of disposing a processed member between an inner molding part and an outer molding part, a process (S300) of molding the processed member so that the processed member includes a bent portion bent along a curved surface of a core cavity. The window molding method may further include a process of chemically strengthening the processed member.

In the window molding method (S10) a process (S300) of molding the processed member may include a process (S310) of providing heat to the processed member and a process (S330) of bending the processed member. In the process (S330) of bending the processed member, the processed member may be bent in a state in which the heat is provided so that the processed member includes a first non-bent portion PP-1 (see FIG. 6) and a second non-bent portion PP-2 (see FIG. 6), which face each other with a bent portion BP (see FIG. 6) therebetween.

The process (S310) of providing the heat to the processed member may include a process of providing the heat to at least one of the inner molding part or the outer molding part. The process (S310) of providing the heat to the processed member may include a process of heating the processed member by providing the heat to at least one of the inner molding part or the outer molding part. The processed member may be heated to a temperature having viscoelasticity by the heat provided in the process (S310) of providing the heat to the processed member. For example, in the process (S310) of providing the heat to the processed member, viscosity of a glass substrate may decrease in a range of about $10^7$ poises to about $10^9$ poises by the heat provided from at least one of the inner molding part or the outer molding part.

In the process (S310) of providing the heat to the processed member, the temperature of the processed member may be heated to about 550° C. or more by the heat provided from at least one of the inner molding part or the outer molding part. However, the embodiments are not limited thereto. The processed member, which is the glass substrate, may be thermally molded through the processes including the process (S310) of providing the heat to the processed member.

FIG. 19A is a schematic view illustrating the process (S100) of disposing the processed member between the inner molding part and the inner molding part. The processed member P-WP may be disposed on moving molds MJ1 and MJ2 of the outer molding part OTJ. The processed member P-WP may be disposed between the inner molding part INJ and the outer molding part OTJ in a substantially flat state. In the process (S100) of disposing the processed member, substantially flat portions UFP of the adjacent moving molds MJ1 and MJ2 may be arranged side by side to be adjacent to each other below the processed member P-WP.

After the processed member P-WP is disposed between the inner molding part INJ and the outer molding part OTJ, the processed member P-WP may be heated by heat provided through the core molding part CRP of the inner molding part INJ and the moving molds MJ1 and MJ2 of the outer molding part OTJ.

FIG. 19B schematically illustrates a portion of the process (S300) of molding the processed member. FIG. 19B illustrates an intermediate process of changing the processed to member between the first position and the second position. Referring to FIG. 19B, in the process (S300) of molding the processed member, the inner molding part INJ may move in a substantially downward direction BD, which is a direction toward the outer molding part OTJ, and the moving molds MJ1 and MJ2 may rotate along curved surfaces of sub-cavities S-CV1 and S-CV2.

The inner molding part INJ may move in the substantially downward direction BD by its own weight. As the inner molding part INJ moves, the processed member P-WP may be inserted between two adjacent moving molds MJ1 and MJ2 and then is bent. The inner molding part INJ may be pressed be an external force in addition to its own weight. That is, the inner molding part INJ may move in the downward direction BD by a pressure provided from a separate pressing member to bend the processed member P-WP.

On the other hand, when the inner molding part INJ-a illustrated in FIG. 14 is used in the window molding method using the window molding apparatus in the process (S330) of bending the processed member, the inner molding part INJ-a may be in non-contact with the processed member P-WP to bend the processed member P-WP by injecting air having a pressure of about 2 kgf/cm² to about 10 kgf/cm² through a flow path FH (see FIG. 14).

FIG. 19C is a schematic view illustrating the process (S330) of bending the processed member. Referring to FIG. 19C, in the process (S330) of bending the processed member, the inner molding part INJ may be inserted into a space defined by the moving molds MJ1 and MJ2 and the core cavity C-CV with the processed member P-WP therebetween. In the process (S330) of bending the processed member, the substantially flat portions UFP of the adjacent moving molds MJ1 and MJ2 may be spaced apart from each other to face each other with the processed member P-WP therebetween. In addition, the non-bent portions PP-1 and PP-2 (see FIG. 6) of the processed member P-WP may face each other with the substantially flat molding part FP of the inner molding part INJ therebetween.

Figure 20B:
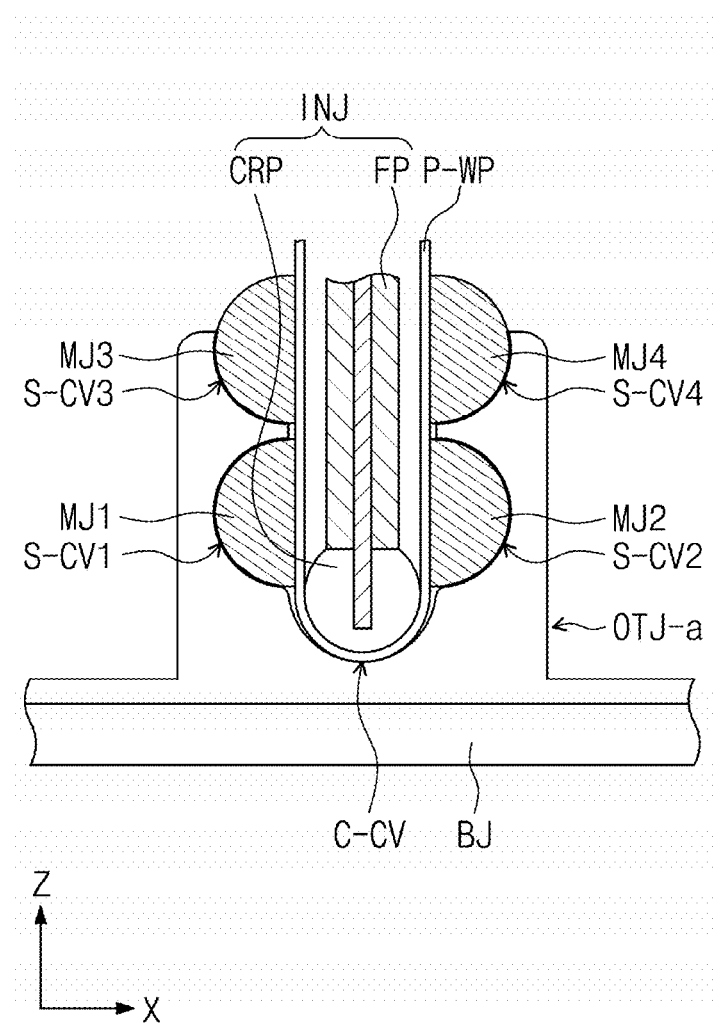
FIG. 20B is a cross-sectional view illustrating another step in the process of the window molding method of FIG. 20A.

FIG. 20A is a cross-sectional view illustrating a step of another process of a window molding method according to the principles of the invention. FIG. 20B is a cross-sectional view illustrating another step in the process of the window molding method of FIG. 20A.

FIGS. 20A and 20B are views illustrating an example of some processes of the window molding method according to an embodiment. Processes of the window molding method of FIGS. 20A and 20B are described with reference to the window molding apparatus including the constituents of the outer molding part OTJ-a of FIGS. 12A and 12B.

Referring to FIGS. 12A and 12B and FIGS. 20A and 20B, the window molding apparatus may include N sub-cavities S-CV1, . . . , and S-CV4, which are sequentially defined in pairs by two from the core cavity C-CV. In addition, the window molding apparatus may include N moving molds MJ1, . . . , and MJ4 corresponding to the N sub-cavities S-CV1, . . . , and S-CV4. N may be an even number of 2 or more.

Referring to FIGS. 20A and 20B, in the process (S330) of bending the processed member, the N moving molds MJ1, . . . , and MJ4 may sequentially operate from the moving mold separated from the core cavity C-CV. As the bent portion BP of the processed member P-WP (see FIG. 6) is bent in a direction close to the core cavity C-CV, the moving molds may move along the curved surfaces of the sub-cavities S-CV1, . . . , and S-CV4 in order from the moving mold spaced apart from the core cavity C-CV to the moving molds MJ1 and MJ2 adjacent to the core cavity C-CV among the N moving molds MJ1, . . . , and MJ4.

FIGS. 20A and 20B illustrate an example when N is 4. Referring to FIGS. 20A and 20B, as the inner molding part INJ moves downward BD, the third moving mold MJ3 and the fourth moving mold MJ4, which are seated in the sub cavities S-CV3 and SCV-4, which are relatively spaced apart from the core cavity C-CV, may move first in the rotation direction along the curved surfaces of the sub-cavities S-CV3 and S-CV4. Thereafter, the first moving mold MJ1 and the second moving mold MJ2, which are relatively adjacent to the core cavity C-CV, may move in the rotation direction UD along the curved surfaces of the sub-cavities S-CV1 and S-CV2.

Thereafter, when the processed member P-WP is bent and disposed between the core molding part CRP of the inner molding part INJ and the core cavity C-CV of the outer molding part OTJ, the pairs of moving molds MJ1 and MJ2, and MJ3 and MJ4 may be spaced apart from each other with the member P-WP therebetween.

The window molding method (S10) may further include a process (S500) of chemically strengthening the processed member. The process (S500) of chemically strengthening the processed member may be a process of chemically strengthening the processed member P-WP that is bent by being processed in strengthened molten salt through the window molding method according to the above-described embodiment. For example, the process (S500) of chemically strengthening the member to be processed may be performed in a temperature range of about 400° C. to about 500° C., but the embodiments are not limited thereto.

Also, the window molding method (S10) may further include a process of polishing the member to be processed. The process of polishing the member to be processed may be performed after the process (S300) of molding the member to be processed. In the process of polishing the member to be processed, only the outer surface of the processed member may be polished. The outer side WP-OS (see FIG. 3) of the window in which the polishing process is performed may have surface roughness of about 3 Å to about 7 Å. In addition, the inner side WP-IS (see FIG. 3) of the window in which the polishing is not performed may have surface roughness of about 3 Å or less.

Window molding methods according to the principles of the invention may be used for manufacturing a window including a bent at a large bending angle by being thermally molded using a window molding apparatus constructed according to the principles and embodiments of the invention that may include an inner molding part and an outer molding part disposed below the inner molding part. Particularly, the window molding methods may be used to manufacture a window that is bent at an angle of about 180°, in which the non-bent portions disposed on both the sides of the bent portion face each other in a generally parallel position. In addition, the window molding method may be used for manufacturing a window having excellent dimensional stability and improved surface quality by simultaneously molding the inside and the outside of the window using embodiments of the window molding apparatus including the inner molding part and the outer molding part.

Although certain embodiments and implementations have been described herein, other embodiments and modifications will be apparent from this description. Accordingly, the inventive concepts are not limited to such embodiments, but rather to the broader scope of the appended claims and various obvious modifications and equivalent arrangements as would be apparent to a person of ordinary skill in the art.

What is claimed is:

1. An apparatus for molding a window, the apparatus comprising:
    a first molding part;
    a jig disposed below the first molding part, the jig including a bottom surface and a plurality of side surfaces configured to support and seat a work piece to be processed into a window; and
    an second molding part disposed on the bottom surface, wherein the second molding part comprises:
        a lower surface adjacent to the bottom surface;
        an upper surface facing the lower surface;
        a first cavity having a first curved surface generally concave in a direction facing the lower surface;
        a plurality of second cavities extending from the first cavity, the plurality of second cavities having second curved surfaces; and
        a plurality of movable molds disposed in the second cavities and supported for movement along the second curved surfaces, respectively, and
    wherein shafts rotatably connect the plurality of movable molds to the jig.

2. The window molding apparatus of claim 1, wherein each of the movable molds comprises a curved portion having a third curved surface corresponding to the second curved surface and a substantially flat portion facing the curved portion.

3. The window molding apparatus of claim 2,
    wherein the window molding apparatus is configured to mold the work piece that comprises first and second substantially non-bent portions, with a bendable portion disposed therebetween,
    wherein the window molding apparatus is movable between a first configuration and a second configuration,
    wherein, in the first configuration, the substantially flat portion of each of the movable molds is disposed generally parallel to the lower surface and configured to support the bendable portion as a flat structure, and
    wherein, in the second configuration, and the substantially flat portion of each of the movable molds is disposed generally perpendicular to the lower surface and configured to bend the bendable portion to the first cavity.

4. The window molding apparatus of claim 1, wherein the second cavities comprise a first sub-cavity and a second sub-cavity disposed in a generally symmetrical position with respect to the first cavity, and
    the movable molds comprise a first movable mold disposed in the first sub-cavity and a second movable mold disposed in the second sub-cavity.

5. The window molding apparatus of claim 4,
    wherein the window molding apparatus is configured to mold the work piece that comprises first and second substantially non-bent portions, with a bendable portion disposed therebetween,
    wherein the window molding apparatus is movable between a first configuration and a second configuration,
    wherein, in the first configuration, the first movable mold and the second movable mold are disposed adjacent to each other below the work piece and configured to support the bendable portion as a flat structure, and
    wherein, in the second configuration, the first movable mold and the second movable mold are spaced apart from and face each other with and configured to bend the bendable portion generally concavely in the first cavity and receive the first substantially non-bent portion and the second substantially non-bent portion between the first movable mold and the second movable mold.

6. The window molding apparatus of claim 1, wherein the first molding part comprises an inner molding part including a substantially flat molding part and a core molding part disposed on one end of the substantially flat molding part, the core molding part having a curved lower surface.

7. The window molding apparatus of claim 6, wherein the lower surface of the core molding part has a fourth curved surface corresponding to the first curved surface,
    wherein the fourth curved surface has a radius of curvature approximately equal to or less than a radius of curvature of the first curved surface.

8. The window molding apparatus of claim 6, wherein the inner molding part further comprises a heating member inserted into a through-hole extending through the substantially flat molding part and extending to the core molding part.

9. The window molding apparatus of claim 1, wherein the first molding part defines a flow path, and
    the window molding apparatus further comprises a pump to inject air toward the second molding part through the flow path.

10. The window molding apparatus of claim 1, wherein the second cavities comprises N sub-cavities, and
    the N sub-cavities are provided in pairs by two and defined between the first cavity and the upper surface, where the N is an even number of 2 or more.

11. The window molding apparatus of claim 10, wherein two of the N sub cavities are disposed generally symmetrical to the first cavity.

12. The window molding apparatus of claim 10, wherein the movable molds comprise N movable molds disposed in one to one correspondence with the N sub-cavities.

13. The window molding apparatus of claim 10, wherein each of the sub cavities defined at an M-th sequence from the first cavity has a radius of curvature different from a radius of curvature of each of the sub-cavities defined at an (M+1)-th sequence from the first cavity, where the M is an integer of 1 or more and N/2 or less.

14. The window molding apparatus of claim 1, wherein the first molding part comprises an inner molding part, the second molding part comprise an outer molding part, the first cavity comprises a core cavity and the second cavities comprise sub-cavities.

15. An apparatus for molding a window, the apparatus comprising:
- a first molding part;
- a jig disposed below the first molding part; and
- a second molding part disposed below the first molding part, wherein the second molding part comprises:
- a lower surface;
- an upper surface facing the lower surface;
- a first cavity having a first curved surface substantially concave in a direction facing the lower surface;
- at least two second cavities extending from the first cavity, the at least two second cavities having second curved surfaces; and
- at least two movable molds seated on the at least two second cavities, respectively, and supported for rotation about shafts, wherein shafts rotatably connect the at least two movable molds to the jig.

16. The window molding apparatus of claim 15, wherein the at least two movable molds are spaced apart from the at least two second cavities.

17. The window molding apparatus of claim 16, wherein the first molding part comprises an inner molding part, the second molding part comprise an outer molding part, the first cavity comprises a core cavity and the second cavities comprise sub-cavities.

* * * * *